(12) United States Patent
Funato et al.

(10) Patent No.: US 12,379,035 B2
(45) Date of Patent: Aug. 5, 2025

(54) VALVE, AND METHOD FOR MANUFACTURING SAID VALVE

(71) Applicant: KITZ CORPORATION, Tokyo (JP)

(72) Inventors: Masazumi Funato, Chiba (JP); Tetsuya Watanabe, Chiba (JP); Mitsuru Hosokawa, Chiba (JP)

(73) Assignee: KITZ CORPORATION, Tokyo (JP)

( * ) Notice: Subject to any disclaimer, the term of this patent is extended or adjusted under 35 U.S.C. 154(b) by 0 days.

(21) Appl. No.: 18/269,845

(22) PCT Filed: Dec. 28, 2021

(86) PCT No.: PCT/JP2021/048902
§ 371 (c)(1),
(2) Date: Jun. 27, 2023

(87) PCT Pub. No.: WO2022/145463
PCT Pub. Date: Jul. 7, 2022

(65) Prior Publication Data
US 2024/0068577 A1 Feb. 29, 2024

(30) Foreign Application Priority Data
Dec. 28, 2020 (JP) ................. 2020-219484

(51) Int. Cl.
*F16K 5/06* (2006.01)
*F16K 5/20* (2006.01)
(52) U.S. Cl.
CPC .......... *F16K 5/0636* (2013.01); *F16K 5/0605* (2013.01); *F16K 5/0626* (2013.01); *F16K 5/201* (2013.01); *F16K 5/202* (2013.01)

(58) Field of Classification Search
CPC .... F16K 27/067; F16K 5/0626; F16K 5/0636; F16K 5/0605; F16K 5/201; F16K 5/202
See application file for complete search history.

(56) References Cited

U.S. PATENT DOCUMENTS 3,414,233 A 12/1968 Priese
4,054,262 A * 10/1977 Laignel ................. F16K 27/107
251/315.15
(Continued)

FOREIGN PATENT DOCUMENTS

| CH | 277426 A | 8/1951 |
|---|---|---|
| CN | 111306317 A | 6/2020 |

(Continued)

OTHER PUBLICATIONS

International Search Report for PCT/JP2021/048902 and its English translation. Mailed Feb. 1, 2022. 4 pages.
(Continued)

*Primary Examiner* — Atif H Chaudry
(74) *Attorney, Agent, or Firm* — Casimir Jones, S.C.; Robert A. Goetz

(57) ABSTRACT

A valve (10) of an embodiment of the present invention has a tapered section (55) on an opening side of a depression (51*a*) of a body (1). When a projection (4*b*) of a ball (4) is inserted into the depression (51*a*), a part of a tip end edge of the projection (4*b*) is brought into contact with the tapered section (55), and the tapered section (55) guides the projection (4*b*) so that the entire circumference of the tip end edge of the projection (4*b*) is located on a bottom side with respect to the tapered section (55).

16 Claims, 12 Drawing Sheets

(56) References Cited

U.S. PATENT DOCUMENTS

| | | | |
|---|---|---|---|
| 5,135,019 A * | 8/1992 | Dupont | F16K 5/202 137/454.6 |
| 7,887,024 B2 | 2/2011 | Timko et al. | |
| 2014/0084198 A1 | 3/2014 | Ikeda | |
| 2014/0110936 A1 | 4/2014 | Shinohara | |
| 2017/0299065 A1 | 10/2017 | Miyashita et al. | |
| 2019/0154161 A1 | 5/2019 | Kazama et al. | |
| 2020/0124190 A1 | 4/2020 | Kawamoto et al. | |

FOREIGN PATENT DOCUMENTS

| | | |
|---|---|---|
| GB | 1459520 A | 12/1976 |
| JP | 48-29236 | 9/1973 |
| JP | 59-194665 | 12/1984 |
| JP | 05-42846 | 6/1993 |
| JP | 2001-280517 | 10/2001 |
| JP | 2003-83457 | 3/2003 |
| JP | 2018-054070 | 4/2018 |
| JP | 2019-65984 | 4/2019 |
| WO | WO 2016/056535 | 4/2016 |
| WO | WO 2016/182066 | 11/2016 |

OTHER PUBLICATIONS

Written Opinion for PCT/JP2021/048902 and its English Translation. Report completed Mar. 30, 2022. 7 pages.

Written Opinion for PCT/JP2021/048918 and its English Translation. Mar. 22, 2022. 6 pages.

International Search Report for PCT/JP2021/048918 and its English translation. Mailed Mar. 22, 2022. 4 pages.

European Search Report for EP Patent Application No. 21915321.0, dated Oct. 1, 2024, 7 pages.

European Search Report For EP Patent Application No. 21915325.1, dated Oct. 2, 2024, 7 pages.

Office Action For U.S. Appl. No. 18/269,843, dated Feb. 3, 2025, available in Patent Center, 27 pages.

Office Action For EP Patent Application No. 21915321.0, dated May 15, 2025, 6 pages.

Final Office Action For U.S. Appl. No. 18/269,843, dated Jun. 18, 2025, available in Patent Center, 10 pages.

* cited by examiner

VALVE, AND METHOD FOR MANUFACTURING SAID VALVE

STATEMENT OF RELATED APPLICATIONS

This application is a national phase application under 35 U.S.C. § 371 of PCT International Application No.: PCT/JP2021/048902, filed on Dec. 28, 2021, which claims the benefit of JP Patent Application No. 2020-219484, filed Dec. 28, 2020, the contents of each of which are incorporated by reference herein.

TECHNICAL FIELD

The present invention relates to a valve and a method for manufacturing the valve. In particular, the present invention relates to a valve capable of axially supporting a valve disc properly in a body, and a method for manufacturing the valve.

BACKGROUND ART

A ball valve that is configured to open and close a flow path by rotating, in a valve body, a ball-type valve disc having a through hole has been known.

In a ball valve of Patent Literature 1, a ball valve disc is provided with: a shaft section that is axially supported on a valve body in such a manner as to be rotatable around an axis of rotation; and an output shaft mounting section to which a motor output shaft of a motor is attached, the output shaft mounting section being disposed on a side opposite to the shaft section. A predetermined gap (clearance) is provided between the shaft section and the shaft support hole of the valve body. When the motor rotates the ball valve disc via the motor output shaft, the ball valve disc moves between an open state and a closed state. In the open state, a valve body through hole of the valve body and a ball valve disc through hole of the ball valve disc communicate with each other, and in the closed state, the ball valve disc through hole and the valve body through hole are orthogonal to each other to close the valve body through hole.

In a hemispherical ball valve disclosed in Patent Literature 2, a slide ring made of synthetic resin is interposed between a support shaft portion projecting at a lower end of a valve disc and a support shaft hole into which the support shaft portion is inserted.

When such a valve disc is disposed in the valve body (hereinafter, referred to as the body), a top entry type valve or a side entry type valve may be employed. In the top entry type, the valve disc is inserted from an upper part of the body. In the side entry type, the valve disc is inserted from a side part of the body.

CITATION LIST

Patent Literature

[Patent Literature 1]
  Japanese Patent Application Publication Tokukai No. 2019-65984
[Patent Literature 2]
  Publication of Unexamined Japanese Utility Model Application, Jitsukoushou, No. 59-194665

SUMMARY OF INVENTION

Technical Problem

In a case in which a valve disc and a body are axially supported as described earlier, regardless of whether the type is the top entry type or the side entry type, a shaft section located on a forward side in the insertion direction of the valve disc is hidden by the valve disc and cannot be observed. Thus, adjusting the position of the valve disc during insertion of the shaft section into the shaft support hole of the body may bring the tip end of the shaft section into contact with an opening end portion of the shaft support hole of the valve body, or the periphery thereof. This may apply a load thereto and thus may cause a crack. Further, in a case in which a slide ring made of synthetic resin is provided as in Patent Literature 2, the shaft section may apply an excessive load to the slide ring and thus may cause damage to the slide ring.

Thus, an object of an aspect of the present invention is to provide a valve that is capable of axially supporting a valve disc properly in a body, and a method for manufacturing the valve.

Solution to Problem

To achieve the object, a valve in accordance with an aspect of the present invention is a valve of a top entry type, including: a body having one of a depression and a projection; and a valve disc having the other of the depression and the projection on a tip end side in a direction in which the valve disc is inserted into the body, the valve disc being configured to be placed in the body by fitting the projection in the depression, the depression having, on an opening side, a tapered section that has an inner diameter gradually decreasing toward a bottom of the depression, a part of a tip end edge of the projection being configured to be brought into contact with the tapered section when the projection is inserted into the depression, the tapered section being configured to guide the projection so that an entire circumference of the tip end edge of the projection is located on a bottom side with respect to the tapered section.

To achieve the object, a method for manufacturing a valve in accordance with an aspect of the present invention is a method for manufacturing a valve for manufacturing the abovementioned valve, including: a first step of inserting the valve disc into the body through an upper end opening of the body, and allowing the valve disc to move downward to a lower portion of the body; and a second step of, following the first step, fitting the projection in the depression in the lower portion of the body, to place the valve disc at a predetermined position in the body, wherein, in the second step, a part of a tip end edge of the projection is brought into contact with the tapered section when the projection is inserted into the depression, and the tapered section guides the projection so that an entire circumference of the tip end edge of the projection is located on the bottom side with respect to the tapered section.

Advantageous Effects of Invention

According to an aspect of the present invention, it is possible to provide a valve that is capable of axially supporting a valve disc properly in a body, and a method for manufacturing the valve.

BRIEF DESCRIPTION OF DRAWINGS

FIG. 11 is also a diagram illustrating a state at a point in time when the insertion proceeds further than in FIG. 10.

FIG. 12 is also a diagram illustrating a state at a point in time when the insertion proceeds further than in FIG. 11.

FIG. 13 is also a diagram illustrating a state at a point in time when the insertion proceeds further than in FIG. 12.

DESCRIPTION OF EMBODIMENTS

Embodiment 1

The following will describe an embodiment of the present invention with reference to FIGS. 1 to 14. Taken as an example of a valve in accordance with an embodiment of the present invention is a top entry type valve that is disposed in the middle of a flow path which is formed in a substantially horizontal direction. This, however, does not limit the present embodiment. Alternatively, the valve in accordance with an embodiment of the present invention may be a valve which is different in direction of disposure of the flow path.
(Configuration of Valve 10)

Figure 1:
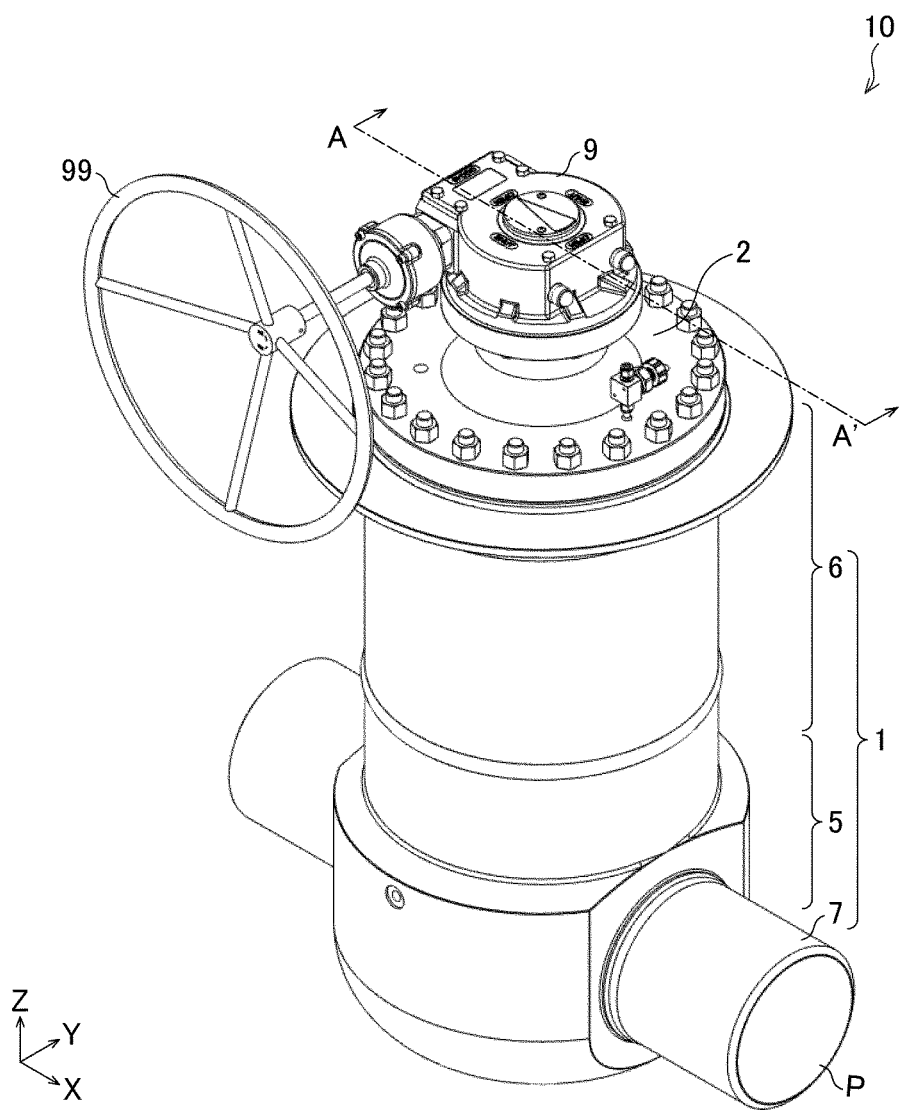
FIG. 1 is a diagram illustrating an appearance of a ball valve, which is an embodiment of a valve in accordance with the present invention.
Figure 2:
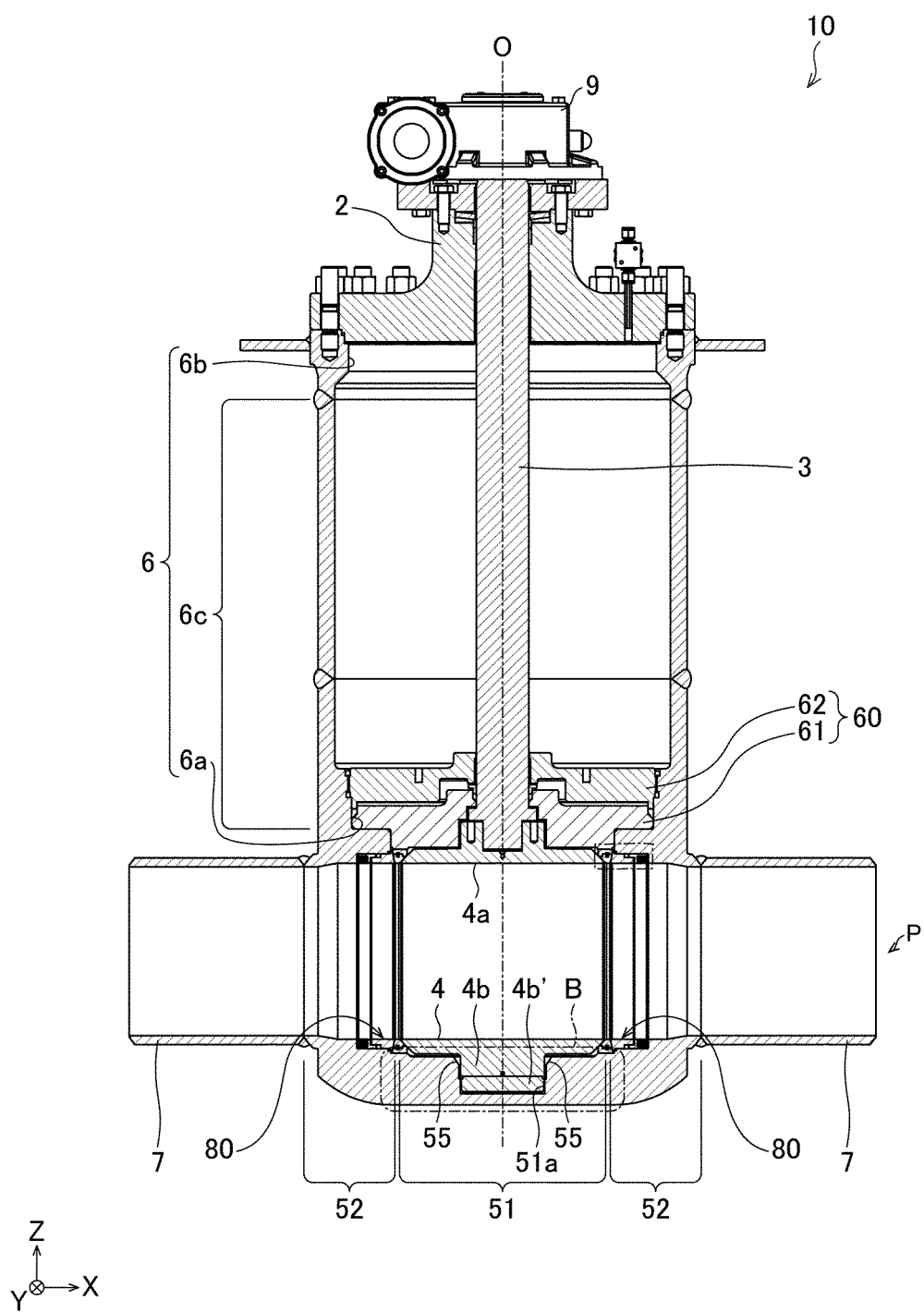
FIG. 2 is a cross-sectional view of the ball valve illustrated in FIG. 1.

FIG. 1 is a perspective view illustrating an appearance of a valve 10 in accordance with an embodiment of the present invention. FIG. 2 is a cross-sectional view of the valve taken along a line A-A' illustrated in FIG. 1. Note that, for convenience of description, three-dimensional coordinates in which a horizontal plane is defined as an XY plane and a zenith direction is defined as a Z direction are also illustrated in FIGS. 1 and 2.

The valve 10 of Embodiment 1 is a so-called trunnion supported ball valve. The valve 10 includes a ball 4 (valve disc), which serves as a ball valve disc, and a body 1, which serves as a valve body that receives thereinside the ball 4.

The body 1 is configured such that a flow path P extending along the X-axis direction (first direction) is provided in a lower end portion of the body 1, and the ball 4 (FIG. 2) is disposed in the middle of the flow path P. The body 1 has a plurality of openings (piping structure section 7) for distributing a fluid. Further, the body 1 has an upper end opening 6b (opening) that opens in a direction (Z-axis direction described later) intersecting with a direction (X-axis direction described later) in which the plurality of openings (piping structure section 7) face and that allows the ball 4 to pass therethrough.

The body 1 includes: a valve disc housing section 5 configured to accommodate the ball 4 (FIG. 2); a stem housing section 6 configured to accommodate the stem 3 (FIG. 2) connected to the ball 4; and the piping structure section 7 that extends in a horizontal direction through side surfaces of the valve disc housing section 5.

Figure 3:
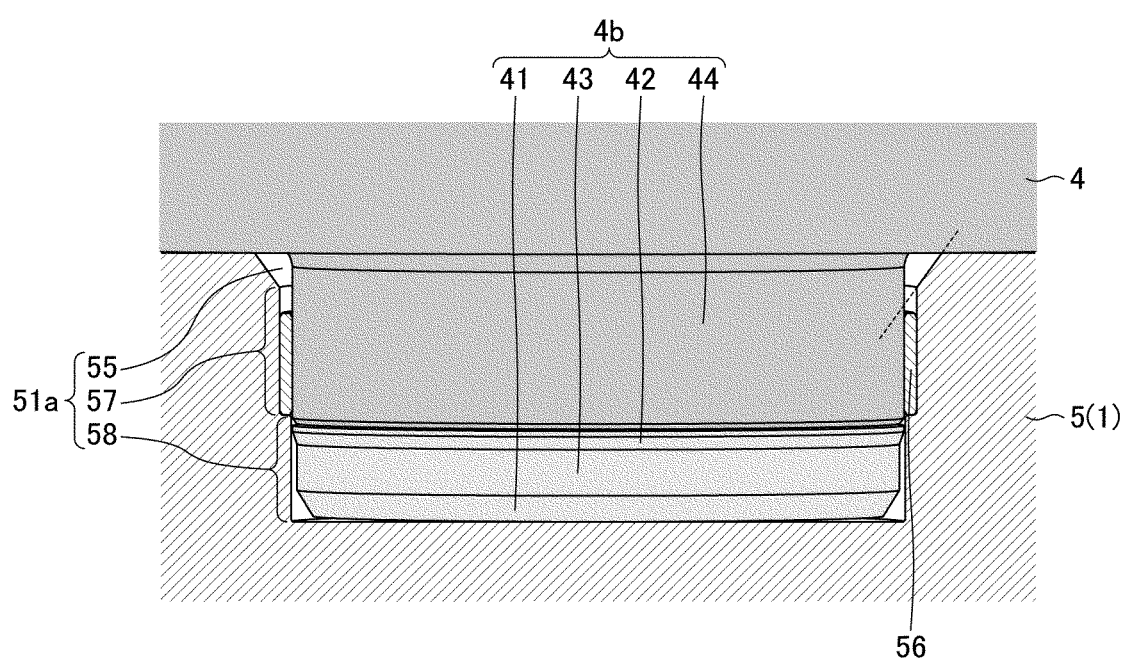
FIG. 3 is a partial cross-sectional view illustrating a state in which a projection of a ball valve disc has been completely inserted into a depression of a body.

The valve disc housing section 5 has a hollow central region 51 in which the ball 4 can be rotatably disposed. The central region 51 has an inner surface configured to be in contact with a lower surface of the ball 4. In this inner surface, the central region 51 is provided with a depression 51a in which a projection 4b provided on the lower surface of the ball 4 is to be fitted. The depression 51a will be described later. Above the central region 51, a communication port 6a is open and provides communication between a hollow portion of the central region 51 and an internal space of the stem housing section 6. The valve disc housing section 5 further has an end region 52 that is provided between the central region 51 and the piping structure section 7 and that provides communication between the hollow portion of the central region 51 and an inner part of the piping structure section 7. The end region 52 has a circular tube-shaped inner circumferential surface that has an axis of pipe extending along a left-and-right direction of the paper sheet of FIG. 2. On this inner circumferential surface, a support mechanism 80 that supports the ball 4 from lateral sides is disposed. Although the details are not illustrated, the support mechanism 80 is constituted by: a ball seat that serves as a seal section for the ball 4, which serves as a valve disc; a retainer gland that supports the ball seat from the piping structure section 7 side; and a spring member disposed in the retainer gland and configured to urge the retainer gland toward the ball seat. The support mechanism 80 exhibits a sealing function by pressing the ball seat toward the ball 4. The ball 4 is held at a specific position in the valve disc housing section 5 by being supported by the support mechanism 80 from the piping structure section 7 sides on the both sides. In FIG. 3, the lower surface of the ball 4 appears to be in contact with the valve disc housing section 5. In practice, however, the lower surface of the ball 4 and the valve disc housing section 5 are slightly spaced apart from each other, and the ball 4 is not supported in contact with the valve disc housing section 5. As will be described later, the ball 4 rotates with rotary motion of the stem 3 by the operation of the operation section 9. In this case, the ball 4 only slides with respect to the ball seat of the support mechanism 80 and slides with respect to the inner circumferential surface (in particular, an inner circumferential surface of the bearing section 56, which will be described later) of the depression 51*a* of the projection 4*b* of the ball 4. Thus, since these slides greatly affect the operating torque of the ball 4, it is very important that the inner circumferential surface (inner circumferential surface of the bearing section 56) of the depression 51*a* is maintained without a crack or the like.

The stem housing section 6 is a circular tube-shaped structure having an axis of pipe in the vertical direction (Z direction) and has, at a lower end portion thereof, a communication port 6*a* that communicates with the hollow portion of the central region 51. An opening diameter (bore) of the communication port 6*a* along the horizontal direction is larger than the diameter of the ball 4 along the horizontal direction. Located at the communication port 6*a* is a part where the upper surface of the ball 4 and the stem 3 are connected to each other. Further, provided at the upper end portion of the stem housing section 6 is an upper end opening 6*b* (opening) that has a diameter larger than the diameter of the ball 4 along the horizontal direction. Further, an inner diameter of an intermediate portion 6*c* which is located between the lower end portion of the stem housing section 6 and the upper end portion thereof is also larger than the diameter of the ball 4 along the horizontal direction.

As illustrated in FIG. 2, the inner lid body 60 is attached to the communication port 6*a* of the stem housing section 6. The inner lid body 60 rotatably fixes the ball 4 so that the ball 4 does not jump out of the valve disc housing section 5, and the inner lid body 60 also liquid-tightly or air-tightly partitions off the space on the ball 4 side (valve disc housing section 5) in the body 1. The inner lid body 60 has a trunnion plate 61 and a yoke plate 62.

The ball 4 is a sphere valve disc through which a flow path 4*a* is formed to penetrate. The flow path 4*a* has a bore that is equal to a pipe diameter (length along the Z-axis direction) of the piping structure section 7 extending in the horizontal direction (X-axis direction) through the side surfaces of the valve disc housing section 5. Thus, setting the bore of the flow path 4*a* of the ball 4 and the pipe diameter of the piping structure section 7 to be equal to each other prevents the ball 4 from becoming an obstacle to the fluid in the flow path formed from the piping structure section 7. This makes it possible to smoothly flow a large amount of fluid at a high pressure.

The ball 4 has an upper surface connected to the stem 3 and a lower surface that is on an opposite side of the ball 4 from the upper surface, and the projection 4*b* that projects downwards is provided on the lower surface of the ball 4. The projection 4*b* is configured to be fitted in the depression 51*a* of the valve disc housing section 5. The projection 4*b* will be described later in conjunction with the depression 51*a*.

The stem 3 constitutes a valve shaft that extends in a vertical direction illustrated in FIG. 2. The stem 3 extends from the upper surface of the ball 4 accommodated in the valve disc housing section 5 to the outside of the upper end opening 6*b* of the body 1. The stem 3 is connected to the operation section 9 fixed to a bonnet 2 for sealing the upper end opening 6*b*, and the stem 3 is rotated by a handwheel 99 provided in the operation section 9. This allows the ball 4 to rotate about a central axis O (FIG. 2) that extends in the vertical direction, depending on the amount of rotation of the handwheel 99. The flow path P is opened and closed by rotation of the ball 4, and is changed in state from a closed state to an open state by rotation of the ball 4 by 90°. The state illustrated in FIG. 2 is a state such that the ball 4 is in the open state. This provides communication between the piping structure section 7 on the left side of the ball 4 on the paper sheet of FIG. 2 and the piping structure section 7 on the right side of the ball 4 on the paper sheet of FIG. 2, and allows a fluid to flow from, for example, the left side of the paper sheet to the right side of the paper sheet.

(Depression 51*a* and Projection 4*b*)

FIG. 3 is an enlarged view of a part indicated by a box B illustrated in FIG. 2. Note that, for convenience of description, FIG. 3 depicts the projection 4*b* in a perspective view, instead of in a cross-sectional view. As illustrated in FIG. 3, the depression 51*a* of the valve disc housing section 5 is provided with, on an opening side, a tapered section 55 that has an inner diameter gradually decreasing toward the bottom of the depression 51*a*. The required thickness (D3 to be described later) of the projection 4*b* varies depending on the size of the ball 4. The projection 4*b* is set to have a thickness that can withstand the rotary motion of the ball 4. From the viewpoint of ease of processing and ease of transmitting the rotational torque of the stem 3, it is preferable that the projection 4*b* be as thick as the projection provided for connection to the stem 3 on the upper portion of the ball 4. The larger the diameter of the projection 4*b* is, the easier it is to fix the ball 4 from the upper end opening 6*b* of the body 1 to the valve disc housing section 5. For example, the diameter of the projection 4*b* can be about ½ of the diameter of the ball 4.

The tapered section 55 guides the tip end portion of the projection 4*b* when the projection 4*b* provided on the lower surface of the ball 4 is inserted into the depression 51*a*. Specifically, during the insertion, a part of the tip end edge of the projection 4*b* is brought into contact with the tapered section 55. For example, when the ball 4 is introduced into the valve disc housing section 5 with the ball 4 inclined, the following will occur. That is, as the projection 4*b* advances toward the depression 51*a*, the inclination of the ball 4 is corrected to be vertical by the guide provided by the tapered section 55, and the central axis of the projection 4*b* moves (to be aligned) in a direction such that the central axis of the projection 4*b* approaches the central axis of the depression 51*a*. This allows the projection 4*b* to be guided so that the entire circumference of the tip end edge of the projection 4*b* is located on a bottom side of the depression 51*a* with respect to the tapered section 55. That is, when a portion of the tip end portion of the projection 4*b* in contact with the tapered section 55 moves past the tapered section 55, the entire circumference of the tip end edge of the tip end portion of the projection 4*b* is guided to a side closer to the bottom of the depression 51*a* with respect to the tapered section 55. Thus, the projection 4*b* is guided to the depression 51*a* so as not to come into contact with a wall surface of the depression 51*a*. Note that, in a case of a 10-inch ball valve, there is a possibility that the central axis of the ball 4 is inclined about 3 degrees from the vertical direction in the initial phase of inserting the projection 4*b* into the depression 51*a*. If the inclination exceeds 3 degrees, it may be possible to recognize the inclination by a visual check at the top entry, and to make alignment to some extent. On the other hand, it is difficult to recognize an inclination of 2 degrees or less by a visual check. Thus, the tapered section 55 provided in the body is set so as to reliably come into contact with a first tapered section 41 when the ball 4 is inclined in such a manner that it cannot be recognized by a visual check.

Here, as illustrated in FIG. 3, provided at the tip end edge of the projection 4*b* is the first tapered section 41 that has a diameter gradually decreasing toward the tip end. Thus, when the projection 4*b* is inserted into the depression 51*a*, first, a part of the tip end edge of the first tapered section 41 comes into contact with the tapered section 55. This allows the tip end edge of the first tapered section 41 to be guided by the tapered surface of the tapered section 55, so that the inclination of the projection 4*b* (ball 4) is eliminated and thus the projection 4*b* (ball 4) is aligned. Next, when the tip end edge of the first tapered section 41 moves into the bottom side with respect to the tapered section 55, the edge of the tapered section 55 on the bottom side now comes into contact with the tapered surface of the first tapered section 41. The guiding action caused by this contact further aligns the projection 4*b* (ball 4). Thus, since the projection 4*b* is guided by both the first tapered section 41 and the tapered section 55, there is a further advantage in alignment of the projection 4*b*, and the projection 51*a* is less likely to contact the wall surface of the depression 51*a*. This allows the projection 4*b* to be guided by the tapered section 55, and then, when a portion of the first tapered section 41 of the projection 4*b* in contact with the tapered section 55 moves past the tapered section 55, the entire circumference of the tip end edge of the projection 4*b* is guided to a side closer to the bottom of the depression 51*a* with respect to the tapered section 55. Thus, the projection 4*b* is guided to the depression 51*a* so as not to come into contact with a wall surface of the depression 51*a*.

More specifically, as illustrated in FIG. 3, the projection 4*b* further has, on a base end side thereof with respect to the first tapered section 41, a second tapered section 42 that has a diameter gradually decreasing toward the tip end. Between the first tapered section 41 and the second tapered section 42, a cylindrical intermediate section 43 is provided. The projection 4*b* further has a straight barrel section 44 provided on a ball 4 side with respect to the base end of the second tapered section 42. That is, the projection 4*b* has, along the projection direction, the straight barrel section 44, the second tapered section 42, the intermediate section 43, and the first tapered section 41, in this order.

The projection 4*b* may be such that the straight barrel section 44, the second tapered section 42, the intermediate section 43, and the first tapered section 41 are integrally formed. Alternatively, the components of the projection 4*b* except for the straight barrel section 44 may be constituted by a member separated from the straight barrel section 44 and may be fixed to an end portion of the straight barrel section 44. When the straight barrel section 44 and the other components are formed of separated members, a method of fixing the straight barrel section 44 and the other components may include, for example, screwing and fitting, and is not particularly limited thereto. In this case, the material of the straight barrel section 44 and that of the other components (the second tapered section 42, the intermediate section 43, and the first tapered section 41) may be the same or may be different.

Figure 10:
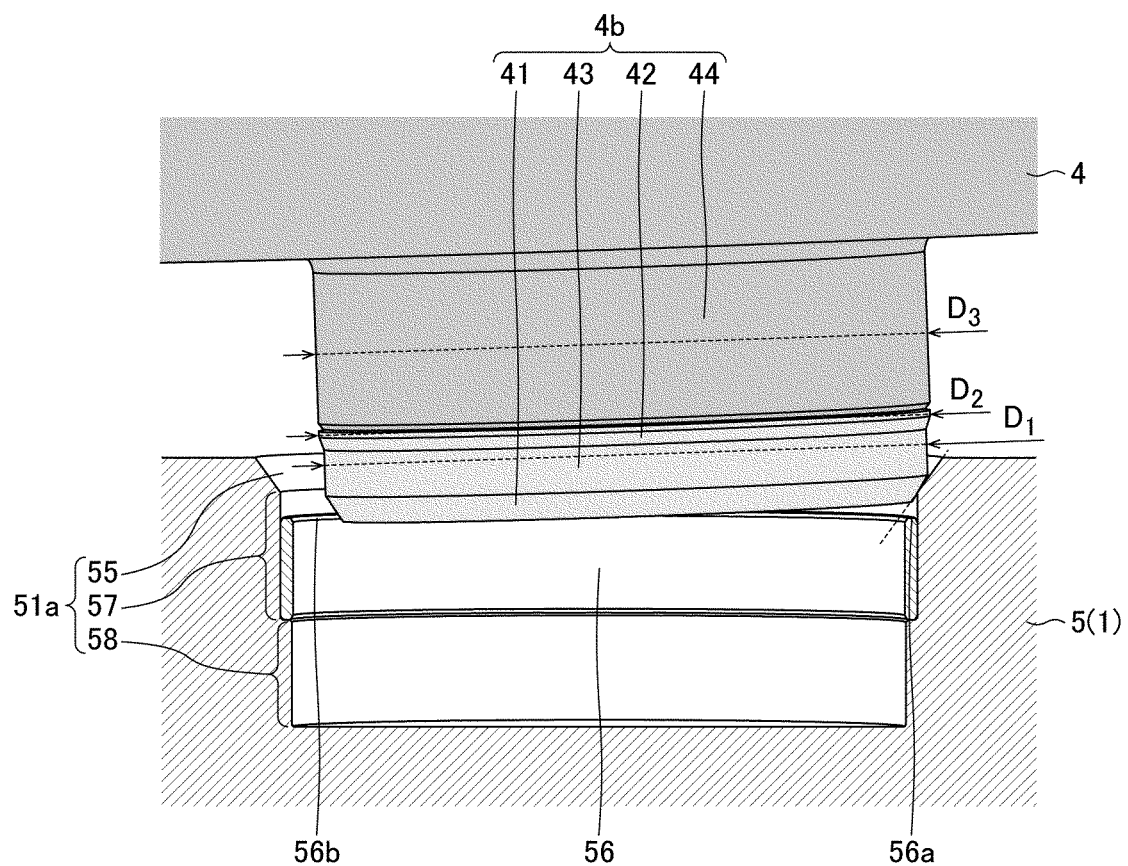
FIG. 10 is a partial cross-sectional view illustrating how the projection of the ball valve disc is inserted into the depression of the body in an insertion process of the ball valve disc of the ball valve illustrated in FIG. 1.

Here, as illustrated in FIG. 10, assuming that the diameter of the tip end of the second tapered section 42 is D1, the diameter of the base end of the second tapered section 42 is D2, and the diameter of the straight barrel section 44 is D3, the relational expression D1<D2<D3 is satisfied. Note that the diameters D1, D2, and D3 are indicated in FIG. 10. This allows the projection 4*b* to have a tapered shape. Thus, the projection 4*b* can be easily fitted in the depression 51*a* during insertion. In particular, since the projection 4*b* serves as a rotating shaft (lower stem) of the ball 4 in a state in which the projection 4*b* is fitted in the depression 51*a*, the diameter D3 of the straight barrel section 44 is typically set to be substantially equal to the inner diameter of the depression 51*a* (or the inner diameter of the bearing section 56, which will be described later), in order to prevent rattling.

Even if the projection 4*b* does not have a tapered shape and the diameters D1 and D2 are the same as the diameter D3, it is still possible to fit the projection 4*b* in the depression 51*a* by means of the guide provided by the tapered section 55. However, setting the projection 4*b* to have a tapered shape makes it possible to achieve the following. That is, first, after the intermediate section 43, which has a diameter less than the inner diameter of the depression 51*a*, is inserted into the depression 51*a* while being aligned by the tapered section 55, the straight barrel section 44, which has a diameter substantially equal to the inner diameter of the depression 51*a*, can be inserted into the depression 51*a* while being aligned at the second tapered section 42. Enabling such two-step alignment allows for further ease of fitting of the projection 4*b* in the depression 51*a*. Note that, in a case in which, in the course of insertion, alignment of the projection 4*b* has already been completed on the tip end side with respect to the second tapered section 42, the second tapered section 42 may not come into contact with the tapered section 55.

Further, in Embodiment 1, as illustrated in FIG. 3, the bearing section 56 disposed on the inner circumferential wall of the depression 51*a* and exposed to the depression 51*a*, is further included. The bearing section 56 has a cylindrical shape and is attached in a strip-shaped manner along a circumferential surface to the inner circumferential wall of the depression 51*a*. More specifically, the bearing section 56 is attached to a first region 57 that has a larger inner diameter owing to a notched inner circumferential surface (of the depression 51*a*) in a portion from an intermediate position in the depth direction of the depression 51*a* to the opening side. The bearing section 56 may be an annular integrated structure, or alternatively, the bearing section 56 may be configured such that bearing materials configured in two curved strip shapes are arranged side by side along the inner circumferential surface of the depression 51*a* in an annular shape. Note that the inner circumferential surface of a second region 58 adjacent to the first region 57 in the inner circumferential wall of the depression 51*a*, and the inner circumferential surface of the bearing section 56 may be flush. Alternatively, the inner diameter of the bearing section 56 may be slightly less than the inner diameter of the second region 58. Further, an upper opening of the bearing section 56 has a tapered section (56*b* in FIG. 4). Thus, since the upper opening of the bearing section has the tapered section 56*b* (FIG. 4), there is an advantage in insertion of the projection 4*b* into the bearing section 56. As described above, when the projection 4*b* is configured to have a tapered shape, the first tapered section 41 and the intermediate section 43 of the projection 4*b* can be easily disposed in the bearing section 56, but the straight barrel section 44 may come into contact with the bearing section 56. Even in this case, it is possible to align the bearing section 56 of the straight barrel section 44 with the tapered section 56*b*. In particular, due to the mutual alignment of the second tapered section 42 of the projection 4*b* and the tapered section of the bearing section 56, it is possible to insert the straight barrel section 44 smoothly into the bearing section 56.

Further, as illustrated in FIG. 10, it is more preferable that an end edge 56*a* of the bearing section 56 on the opening side of the depression 51*a* be on an extension of the inclined surface of the tapered section 55 of the depression 51*a*, or alternatively, it is more preferable that the end edge 56*a* be located on a bottom side of the depression 51*a* with respect to the extension and be located on the bottom side of the depression 51*a* with respect to the extension. The extension are indicated by dotted lines in FIGS. 3 and 10. Note that, when the upper opening of the bearing section 56 is configured to have the tapered section 56b (FIG. 4), it is preferable that the tapered section be located on a bottom side of the depression 51a with respect to the extension. When the end edge 56a of the bearing section 56 or the tapered section of the bearing section 56 is located on the bottom side of the depression 51a with respect to the extension even slightly, it is possible to avoid contact of the tip end edge of the projection 4b (first tapered section 41) with the end edge 56a or the tapered section of the bearing section 56. As an example of a case in which the end edge 56a is located on the bottom side of the depression 51a with respect to the extension, the distance between the end edge 56a of the bearing section 56 and the extension in the axial direction of the depression 51a is, for example, not more than 4 mm, in a case of a 10-inch ball valve. To open and close the ball 4, which serves as the valve disc in the valve 10, the projection 4b serves as a lower rotating shaft (stem) and rotates in the bearing section 56. At this time, the outer circumference of the projection 4b slides with the inner circumference of the bearing section 56. Thus, for example, if there is a crack or the like on the inner circumference of the bearing section 56, the resistance of rotation of the projection 4b increases, resulting in an increase in opening and closing torque of the valve 10. Thus, it is desirable that the bearing section 56 has no crack or the like on its inner circumferential surface. Cracks on the inner circumference of the bearing section 56 may be easily caused during fitting the projection 4b in the depression 51a. However, by defining the position of the end edge 56a or the tapered section of the bearing section 56 as in Embodiment 1, it is possible to prevent the tip end edge of the projection 4b from coming into contact with the inner circumferential surface of the bearing section 56 during insertion. Thus, it is possible to prevent a crack or the like from occurring on the inner circumferential surface of the bearing section 56.

Figure 4:
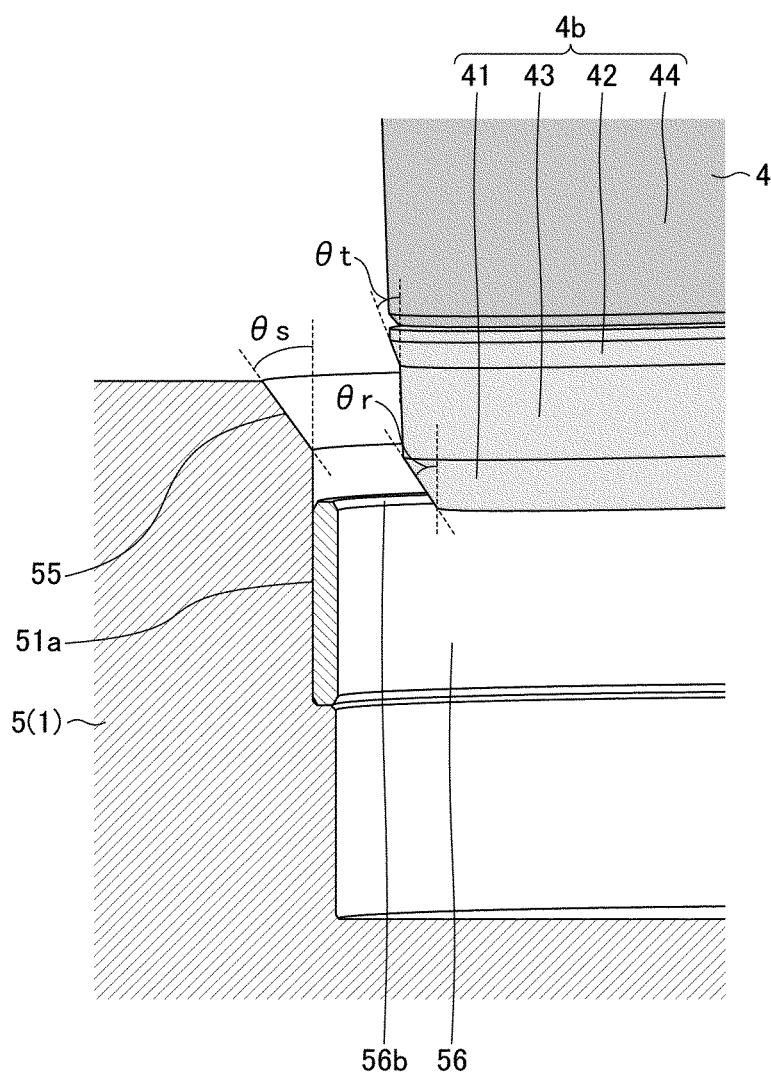
FIG. 4 is an enlarged view of a part of FIG. 3.

Here, FIG. 4 is an enlarged view of the projection 4b and the tapered section 55 of the depression 51a. For convenience of description, FIG. 4 illustrates a state in which the projection 4b is not inserted into the depression 51a. It is herein assumed that θr is an angle of inclination of the first tapered section 41 of the projection 4b with respect to the central axis (indicated by a dotted line in FIG. 4) of the projection 4b, and θs is an angle of inclination of the tapered section 55 of the depression 51a with respect to the central axis (indicated by a dotted line in FIG. 4) of the depression 51a. Although these tapered angles are not particularly limited, the tapered angles are set to angles such that at least the first tapered section 41 and the tapered section 55 can be reliably brought into contact with each other in a case in which there occurs an inclination or a deviation from the center to such a degree that they cannot be visually recognized during accommodating the ball 4 in the valve disc housing section 5. Such an angle varies depending on the size of the valve, and may be, for example, in a range of 30° to 40°. In particular, in a case in which the inclination angle θs is not less than 30°, it is preferable that the relationship θr<θs be satisfied. In a case in which the inclination angle θs is less than 30°, it is preferable that the relationship θr≤θs be satisfied. In a case in which θr and θs are different, the difference therebetween is preferably in a range of 5° to 10°. By defining the angles in this way, the projection 4b can be easily inserted into the depression 51a, and by bringing the first tapered section 41 into contact with the tapered section 55, the central axis of the projection 4b can be aligned to be along the vertical direction. This makes it possible to prevent the tip end edge of the projection 4b from coming into contact with the end edge 56a of the bearing section 56, or alternatively, even in a case in which they come into contact, it is possible to prevent the tip end edge of the projection 4b from applying an excessive load to the end edge 56a of the bearing section 56. For example, for a 10-inch ball valve, θr may be 30° and θs may be 35°.

Further, assuming that θt is an inclination angle of the second tapered section 42 of the projection 4b with respect to the central axis of the projection 4b (indicated by a dotted line in FIG. 4), this θt can be about the same as the inclination angle θr of the first tapered section. However, the inclination angle θt of the second tapered section 42 and the inclination angle θr of the first tapered section 41 may be identical (θt=θr) or may be different. In a case in which the inclination angles are different, the inclination angle θt of the second tapered section 42 may be less than the inclination angle θr of the first tapered section 41. For example, for a 10-inch ball valve, when θr is 30°, θt may be 20°. As described above, this makes it possible to roughly align the intermediate section 43 by using the first tapered section 41 first, and then align the straight barrel section 44 by using the second tapered section 42 with greater precision. This makes it easy to insert the projection 4b into the depression 51a without damaging the inner circumferential portion of the bearing section 56.

(Variation of Bearing Section)

Figure 6:
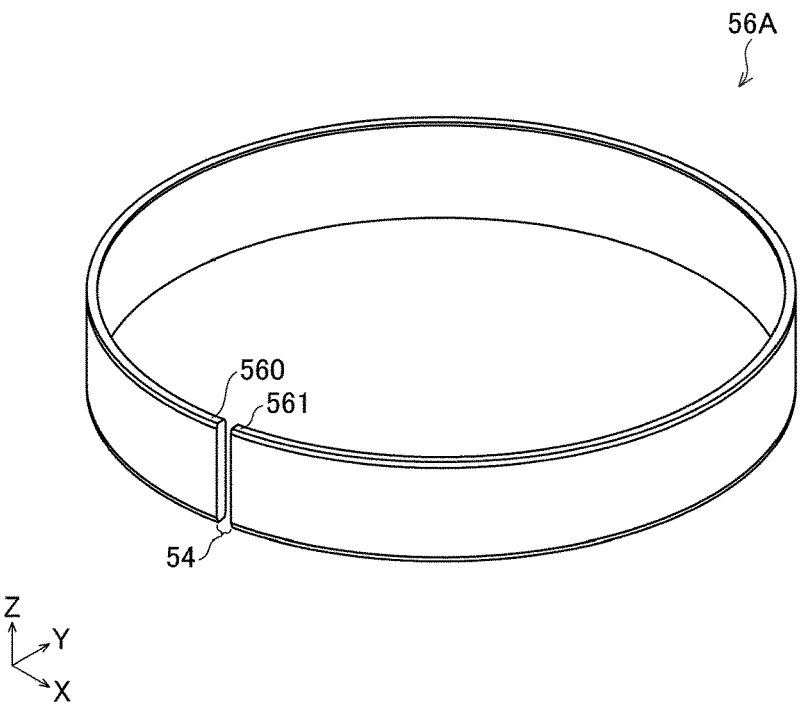
FIG. 6 is a perspective view illustrating an example of a bearing section provided in the ball valve illustrated in FIG. 1.
Figure 7:
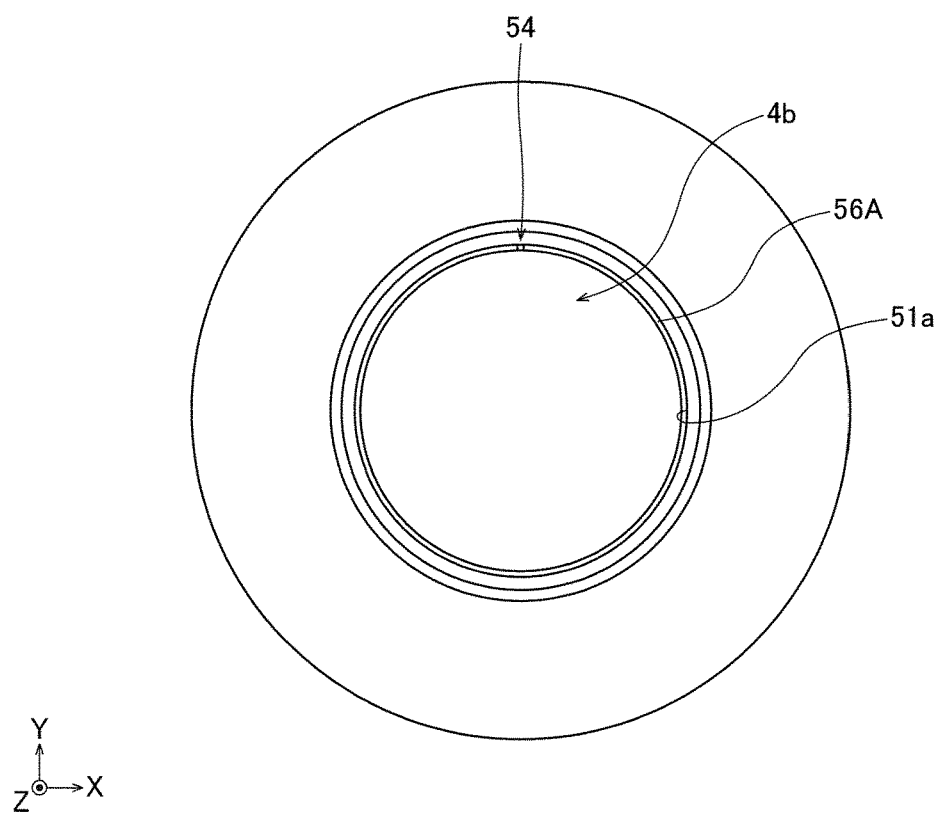
FIG. 7 is a top view illustrating an example of the bearing section provided in the ball valve illustrated in FIG. 1.

Here, FIGS. 6 and 7 illustrate a bearing section 56A, which is another example of the bearing section 56 described above. FIG. 6 is a perspective view of the bearing section 56A in isolation. FIG. 7 is a diagram illustrating a state in which the bearing section 56A is attached to the inner circumferential wall of the depression 51a along the circumferential surface thereof, when viewed from the opening of the depression 51a. For convenience of description, FIG. 7 illustrates a state in which the projection 4b is fitted in the depression 51a.

The bearing section 56A is provided with a slit 54. The slit 54 is a gap that extends from the opening side of the depression 51a to the bottom side of the depression 51a in the state of FIG. 7. The slit 54 allows air present on the bottom side of the depression 51a to be delivered out of the depression 51a during fitting of the projection 4b and the depression 51a in an assembling process of the valve 10. This makes it possible to smoothly fit the projection 4b in the depression 51a, so that a fitting operation can be carried out efficiently.

The length of a strip of the bearing section 56A in the longitudinal direction is shorter than the length of the inner circumferential wall of the depression 51a along the circumferential surface thereof. Thus, when the bearing section 56A is attached to the inner circumferential wall of the depression 51a along the circumferential surface, both end portions 560, 561 (FIG. 6) in the longitudinal direction of the strip of the bearing section 56A are spaced apart to form the slit 54.

Note that, in the example illustrated in FIG. 7, the slit 54 extends in the vertical direction from the opening side to the bottom side of the depression 51a. However, since the slit 54 only has to communicate with the bottom side and the opening side of the depression 51a, the extending direction of the slit 54 is not limited to the vertical direction, and the extending direction may be a direction inclined with respect to the vertical direction.

Note that although the number of the slit 54 provided is only one, it is not limited to one.

Note that the present invention is not limited to the slit 54, and a recessed groove may be provided on a surface of the bearing section 56A which is opposed to the circumferential surface of the projection 4b, so as to allow air on the bottom side of the depression 51a to flow through the recessed groove and to discharge the air to the outside of the depression 51a.

Further, similarly to the slit 54, a recessed groove may be provided on the circumferential surface of the projection 4b, for the purpose of delivery of air present on the bottom side of the depression 51a to the outside of the depression 51a. In this case, air present on the bottom side of the depression 51a may flow through the recessed groove and be discharged to the outside of the depression 51a.

The foregoing is the configuration of the valve 10. Note that the valve 10 may be provided with any additional components in addition to the components described above.

The following will describe a procedure for assembling the valve 10 (Method for manufacturing a valve), a process of accommodating the ball 4 in the valve disc housing section 5 of the body 1, and a mechanism of inserting the projection 4b of the ball 4 into the depression 51a of the valve disc housing section 5.

(Assembly of Valve 10 (Method for Manufacturing Valve))

Figure 5:
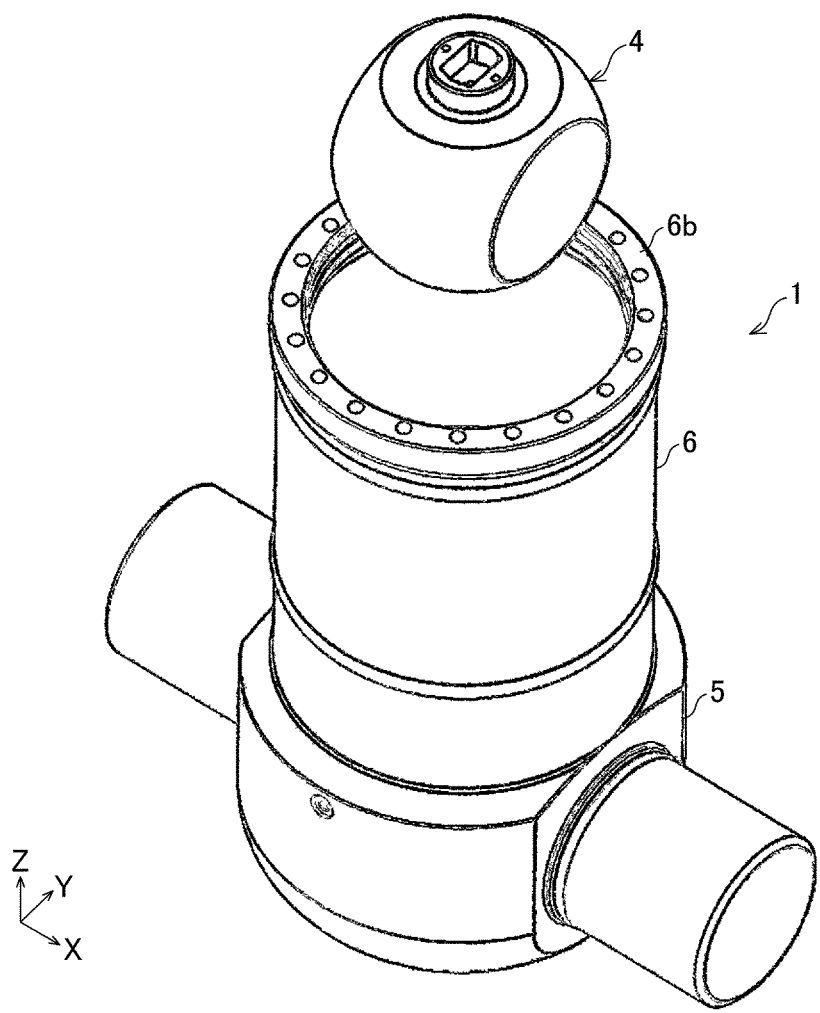
FIG. 5 is a perspective view schematically illustrating how the ball valve disc is inserted into the body by top entry, in a case of the ball valve illustrated in FIG. 1.
Figure 14:
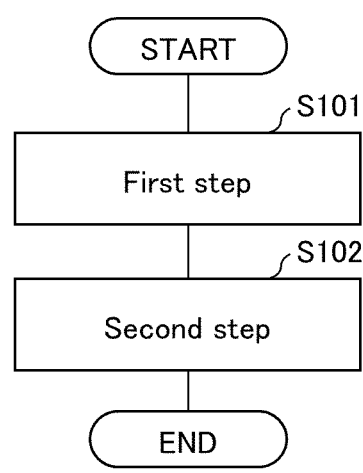
FIG. 14 is a flowchart of a flow of a method for manufacturing the ball valve illustrated in FIG. 1.

A flow of an assembly procedure of the valve in accordance with Embodiment 1 for accommodating the ball 4 in the valve disc housing section 5 of the body 1 (method for manufacturing a valve) is illustrated in FIG. 14. FIG. 14 shows a procedure for installing the ball 4 in the body 1. The procedure includes a first step S101 and a second step S102. In Embodiment 1, as illustrated in FIG. 5, the ball 4 is inserted into the body 1 through the upper end opening 6b of the body 1, to allow the ball 4 to move downward inside the stem housing section 6 (first step S101 of FIG. 14), so as to place the ball 4 in the valve disc housing section 5 (second step S102 of FIG. 14). Such an installation method is a so-called top entry type installation method. Such installation can be realized because, in Embodiment 1, the stem housing section 6 of the body 1, and the upper end opening 6b and the communication port 6a (FIG. 2) are larger in inner diameter than the ball 4. To make the ball 4 move downward, a dedicated jig for inserting the ball 4 into the body 1 is connected to the upper surface of the ball 4. Besides, in Embodiment 1, the ball 4 may be inserted through the upper end opening 6b, using the stem 3 which is connected to the upper surface of the ball 4 illustrated in FIG. 2. Use of the stem 3 eliminates the need to remove the jig as compared to a case in which the dedicated jig is used. Thus, it is possible to efficiently carry out the assembly work. Note that the insertion of the ball 4 into the body 1 may be carried out manually by an operator, or may be carried out semi-automatically or fully automatically.

Figure 8:
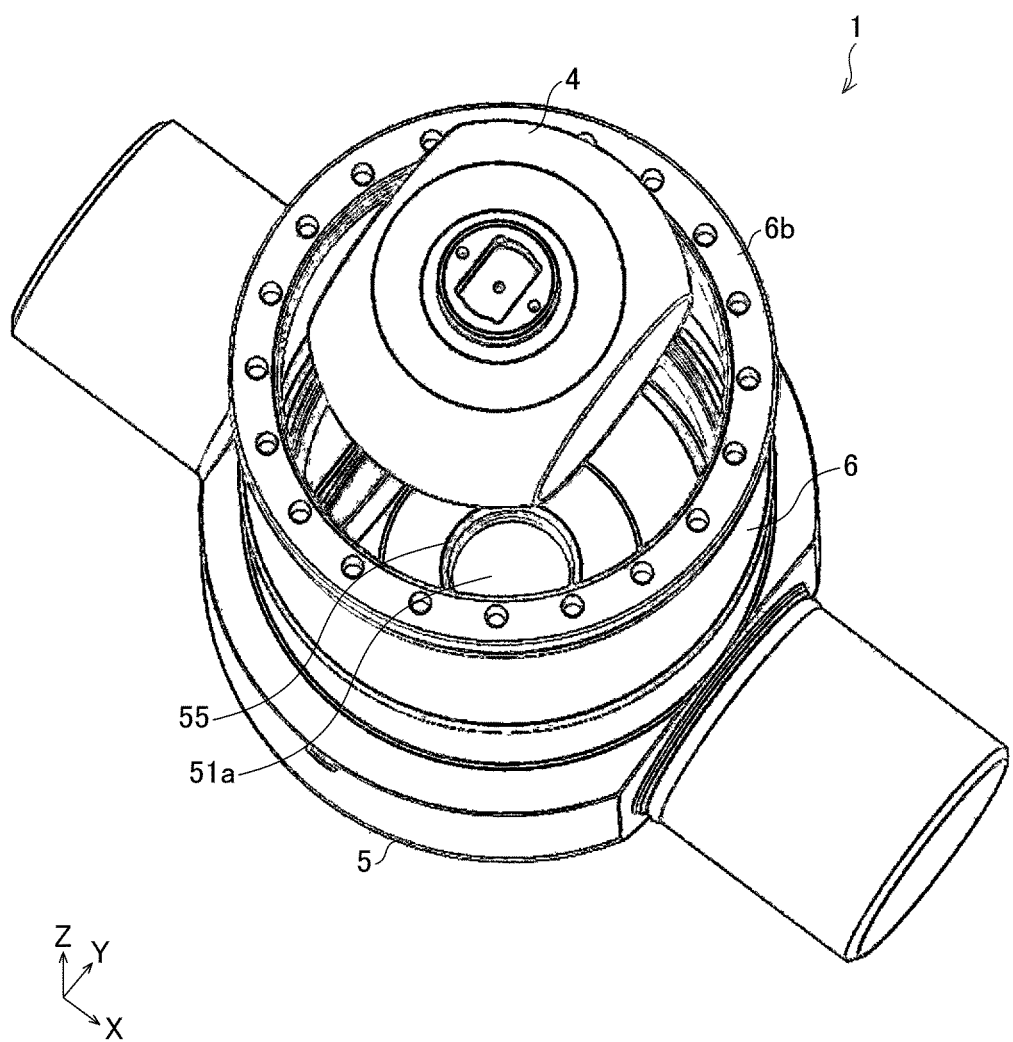
FIG. 8 is a schematic view illustrating how the ball valve disc is inserted into the body, when viewed from above the body, similarly to FIG. 5.
Figure 9:
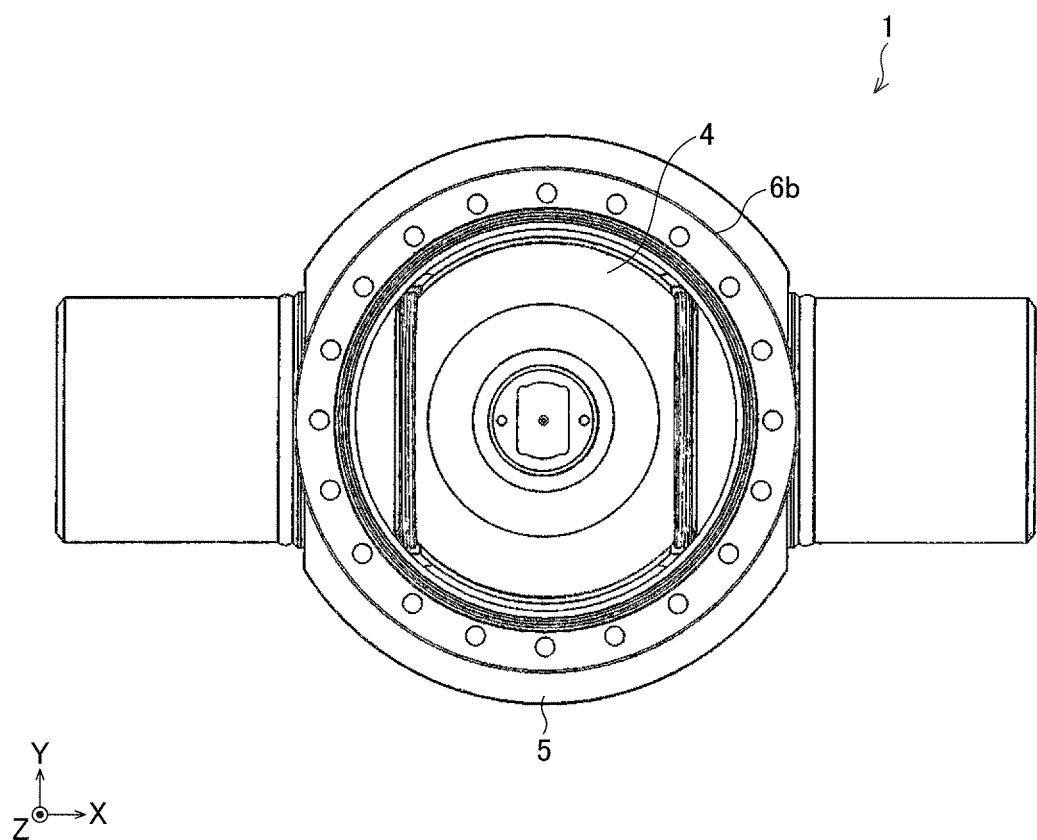
FIG. 9 is a schematic view illustrating how the ball valve disc is inserted into the body, illustrating in a state in the middle of inserting the ball valve disc into the body, when viewed from above the body, similarly to FIG. 5.

FIG. 8 is a diagram illustrating a state in which the ball 4 is entering from the top, when viewed from an angle different from that in FIG. 5. As described earlier, the valve disc housing section 5 is provided with the depression 51a, and the projection 4b (FIG. 3) of the ball 4 is configured to be fitted in the depression 51a. Here, the depression 51a is located in front in the direction in which the ball 4 is inserted. Thus, when the ball 4 is inserted through the upper end opening 6b into the stem housing section 6 of the body 1, the ball 4 produces a blind spot, and the projection 4b and the depression 51a cannot be observed, as illustrated in FIG. 9. However, according to Embodiment 1, since the tapered section 55 is provided on the opening side of the depression 51a, it is possible to guide the projection 4b to the depression 51a without applying any excessive load to the projection 4b as described earlier. The following will describe the insertion process of the projection 4b into the depression 51a in order, with reference to FIGS. 10 to 13.

FIG. 10 illustrates an initial phase in the insertion process. In a phase just before the phase illustrated in FIG. 10, that is, for example, at the time when the ball 4 reaches the valve disc housing section 5, the axis of the jig or the stem 3 is inclined within a range of more than 0° and not more than 3°, with respect to the central axis O of the body 1. In a case in which the ball 4 is inserted into the body 1 by using the axis of the jig or the stem 3 as in Embodiment 1, carrying out the procedure in a state in which the ball 4 is not inclined at all with respect to the central axis O of the body 1 is extremely rare. That is, in most cases, the ball 4 is inserted in a state in which the ball 4 is slightly inclined without intention. On the other hand, in a case in which an inclination of more than 3° occurs, the inclination can be visually recognized. This makes it possible to correct the inclination at the time of recognition. Thus, at the time of insertion of the ball 4, the axis of the jig or the stem 3 is inclined within a range of more than 0° and not more than 3°, with respect to the central axis O of the body 1. In short, Embodiment 1 includes both a case in which insertion is carried out with such an inclination recognized and a case in which insertion is carried out without recognizing the inclination. Then, in the initial phase illustrated in FIG. 10, in which the projection 4b is inserted into the depression 51a (second step S102 of FIG. 14), a part of the first tapered section 41 formed at the tip end edge of the projection 4b comes into contact with the tapered section 55, so that the projection 4b is guided by the tapered section 55 of the depression 51a. Specifically, when a portion of the first tapered section 41 of the projection 4b in contact with the tapered section 55 moves past the tapered section 55, the entire circumference of the tip end edge of the projection 4b is guided to a side closer to the bottom of the depression 51a with respect to the tapered section 55.

Figure 11:
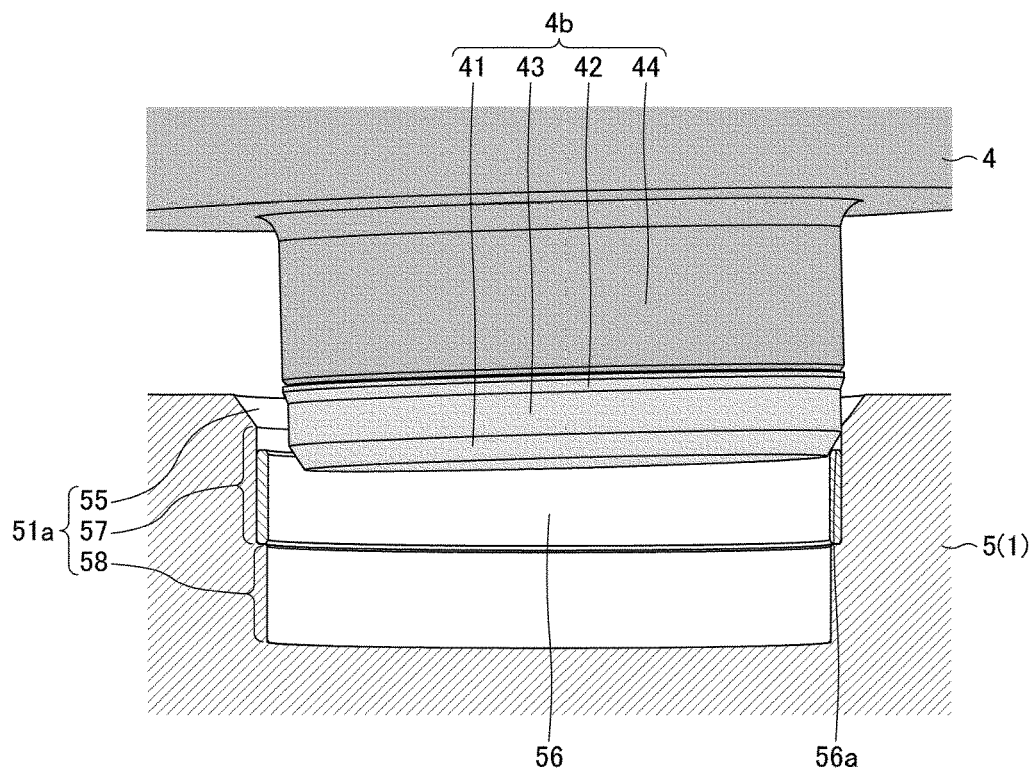
FIG. 11 is a partial cross-sectional view illustrating how the projection of the ball valve disc is inserted into the depression of the body in the insertion process of the ball valve disc of the ball valve illustrated in FIG. 1.

FIG. 11 illustrates a next phase in the insertion process (second step S102 of FIG. 14). In FIG. 11, the contact between the part of the first tapered section 41 and the tapered section 55 has been terminated, and the first phase of alignment of the projection 4b has been completed. After the termination of the contact, the entire circumference of the tip end edge of the projection is located on a bottom side with respect to the tapered section 55. In FIG. 11, the projection 4b is guided so that an end portion on the bottom side of the tapered section 55 slides on a circumferential surface of the intermediate section 43 of the projection 4b guided by the tapered section 55 in FIG. 10, and the projection 4b is further aligned. Even in such a sliding state, since the first tapered section 41 is provided at the tip end edge of the projection 4b as illustrated in FIG. 11, the tip end edge does not apply any excessive load to the end edge 56a of the bearing section 56. Note that, in a state in which the projection 4b is completely inserted into the depression 51a, that is, in a fitted state, there is almost no gap (clearance) between the inner circumferential surface of the bearing section 56 and the diameter D3 of the straight barrel section 44 in which the projection 4b has the largest diameter, or there is provided a small clearance. Specifically, the difference between the inner diameter D4 of the cylindrical bearing section 56 and the D3 is, for example, about 0.1 mm in a case of a 10-inch ball valve. As illustrated in FIG. 11, in the middle of the insertion, there is a gap between the tapered section 55 and the first tapered section 41 or the intermediate section 43 on a side opposite to the contact side across the central axis of the projection 4b.

Figure 12:
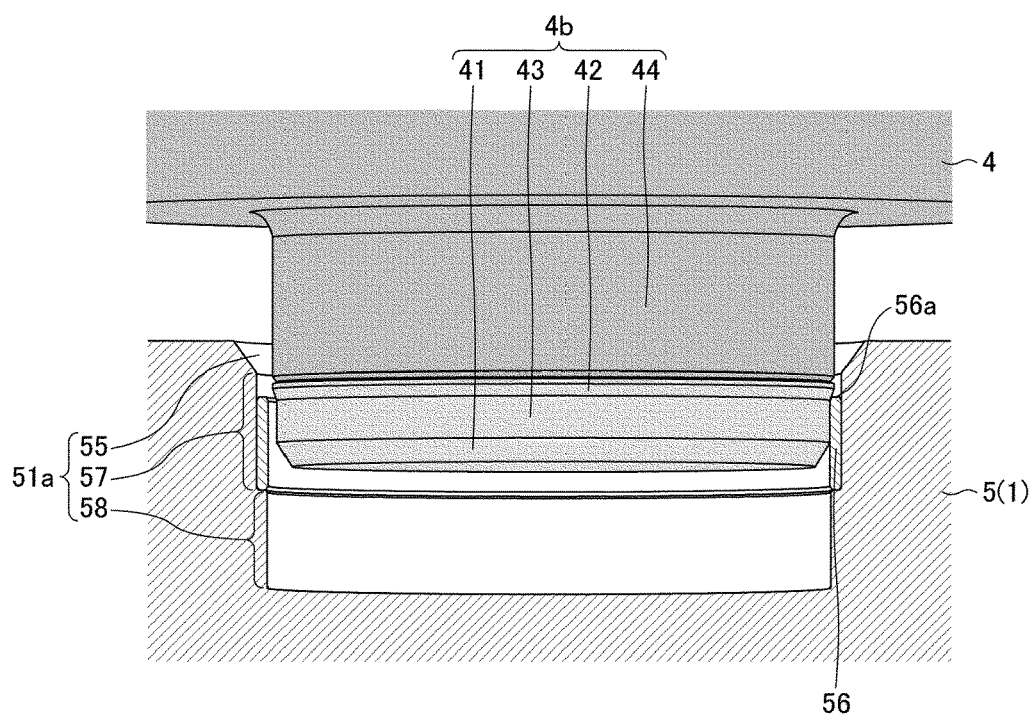
FIG. 12 is a partial cross-sectional view illustrating how the projection of the ball valve disc is inserted into the depression of the body in the insertion process of the ball valve disc of the ball valve illustrated in FIG. 1.

FIG. 12 illustrates a state in which the insertion has further proceeded from the state illustrated in FIG. 11. In the state illustrated in FIG. 12, the alignment of the projection 4b enters the final phase (second step S102 of FIG. 14). Since, the projection 4b is approximately aligned in the foregoing processes, no excessive load is applied although the second tapered section 42 of the projection 4b is in contact with the end edge 56a of the bearing section 56 as illustrated on the right side of FIG. 12. This contact completes the alignment.

Figure 13:
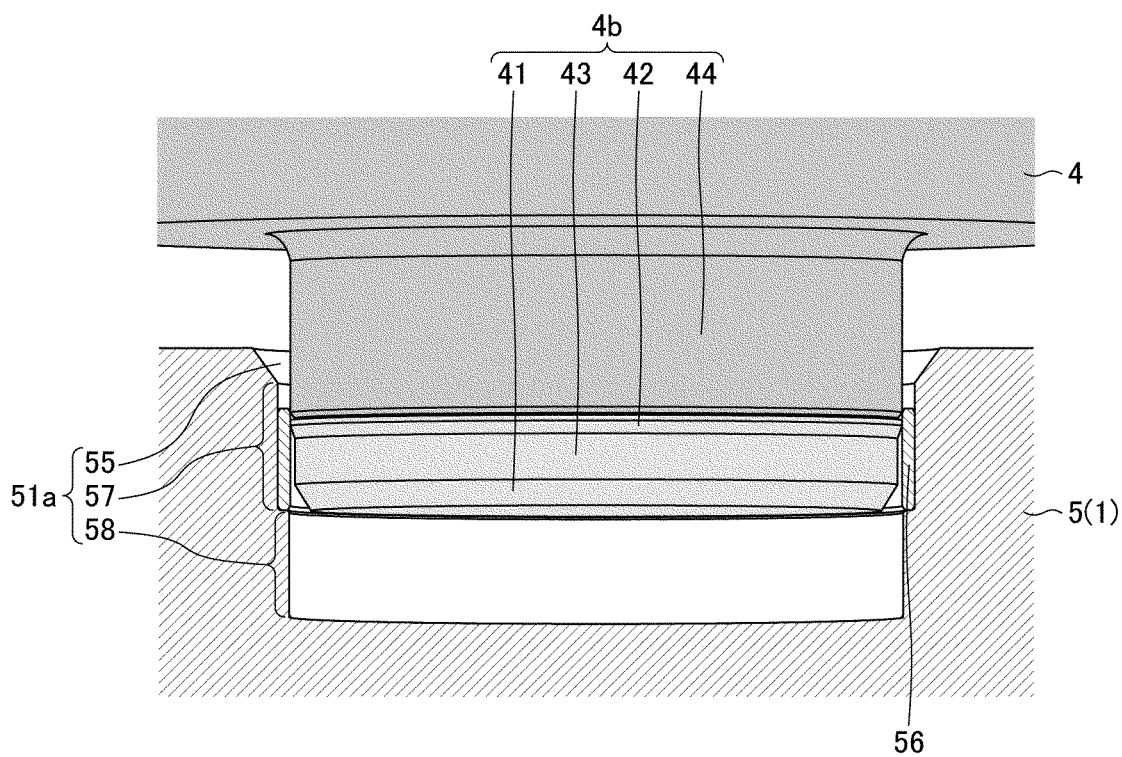
FIG. 13 is a partial cross-sectional view illustrating how the projection of the ball valve disc is inserted into the depression of the body in the insertion process of the ball valve disc of the ball valve illustrated in FIG. 1.

In FIG. 13, a portion of the second tapered section 42 up to the base end thereof is located on the bottom side with respect to the tapered section 55. In this state, the projection 4b applies no excessive load to the bearing section 56 and the depression 51a.

Then, as illustrated in FIG. 3, the projection 4b is completely inserted into the depression 51a (end of the second step S102 of FIG. 14). As described in the foregoing, in Embodiment 1, by rather using the inclination within a range of more than 0° and not more than 3°, which occurs unintentionally during the insertion of the ball 4, it is possible to insert the projection 4b of the ball 4 into the depression 51a of the body 1 while aligning the projection 4b. The projection 4b and the depression 51a have the first tapered section 41 and the tapered section 55 that satisfy the specific conditions described above. These conditions are set by adjusting the first tapered section 41 and the tapered section 55 so that the projection 4b is reliably guided in the depression 51a when the ball 4 inclines more than 0° and not more than 3°.

Here, the valve 10 exemplified in Embodiment 1 assumes a valve that has the flow path 4a of the ball 4 with a relatively larger bore and the piping structure section 7 with a relatively larger pipe diameter. Thus, the ball 4 itself has a greater weight. In this case, if the ball 4 is made to move downward violently in the body 1 when the valve 10 is assembled according to the abovementioned procedure, then the projection 4b and the depression 51a may collide with each other and be damaged, or the projection 4b may come into contact with the bearing section 56 and break it. Thus, to avoid this, it is configured so that, during a period in the assembly procedure in which the ball 4 is inserted into the body 1 and is caused to move downward in the stem housing section 6 (first step of FIG. 14), the ball 4 is made to quickly move downward, and then, the lowering speed is decreased in a phase in which the ball 4 enters the valve disc housing section 5 and the projection 4b approaches the depression 51a. This prevents the tapered section 55 and the first tapered section 41 from violently coming into contact with each other in the second step of FIG. 14. Thus, it is also possible to avoid the abovementioned damage. Note that the installation of the ball 4 in the valve disc housing section 5 may be carried out manually by an operator, or may be carried out semi-automatically or fully automatically.

Thus, in Embodiment 1, by bringing a part of the tip end edge of the projection 4b into contact with the tapered section 55, it is possible to cause the tapered section 55 to guide the projection 4b. With this configuration, even when the projection 4b is inserted into the depression 51a by the top entry, it is possible to axially support the ball 4 properly in the valve disc housing section 5 of the body 1 (FIGS. 2 and 3). In the state illustrated in FIG. 3, in which the projection 4b is fitted in the depression 51a, the straight barrel section 44 is in contact with the inner circumferential surface of the bearing section 56. Meanwhile, the second tapered section 42, the intermediate section 43, and the first tapered section 41 face the second region 58 of the depression 51a across the predetermined gap described earlier.

After the ball 4 is made to be axially supported properly in the valve disc housing section 5 of the body 1, using the foregoing process, the ball 4 is pressed by the inner lid body 60 described earlier. The trunnion plate 61 and the yoke plate 62 are both circular plate bodies, and the center of each of them is provided with a through hole through which the stem 3 penetrates. Further, provided on an outer circumferential surface of the yoke plate 62 is a screw structure that is screwed with another screw structure which is provided on a portion of the inner circumferential surface of the stem housing section 6, and the yoke plate 62 can be fixed to a desired position of the stem housing section 6 by the screwing. Note that a portion to which the inner lid body 60 is fitted is a lower end portion of the intermediate portion 6c in the inner circumferential surface of the stem housing section 6, and corresponds to a portion having a decreased inner diameter. That is, the thickness of the pipe wall of this portion is larger than that of the pipe wall of the other portions of the stem housing section 6. This makes it possible to withstand a radial load associated with the fitting of the inner lid body 60. Note that the fixing of the yoke plate 62 is not limited to the fixing with such a screw, and may be fixing with a predetermined fixing means which can be attached to and detached from the body 1, including, for example, fixing to the body 1 with a bolt. In consideration of, for example, ease of assembly, screwing with a screw structure with respect to the body is preferable. Meanwhile, the trunnion plate 61 is fitted to the inner circumferential surface of the stem housing section 6. However, unlike the yoke plate 62, the trunnion plate 61 is not fixed to the body 1 with use of some fixing means by, for example, screwing. The trunnion plate 61 is fixed at a position illustrated in FIG. 2 by being pressed by the yoke plate 62 toward the ball 4. The trunnion plate 61 and the yoke plate 62 are in contact with each other via seal members, not in such a manner that their counter surfaces are in contact with each other. Thus, by the inner lid body 60 sealing the communication port 6a of the stem housing section 6, it is possible to reliably accommodate the ball 4 in the valve disc housing section 5. This makes it possible to avoid a situation in which the ball 4 jumps upwards inconveniently.

Note that the support mechanism 80 and the piping structure section 7 illustrated in FIG. 2 are disposed on the side of the valve disc housing section 5 before the top entry of the ball 4 is carried out. Thus, the support mechanism 80 supports, from lateral sides, the ball 4 which is axially supported by the valve disc housing section 5.

Note that the valve disc housing section 5 constituting an outer shell element of the body 1, the stem housing section 6, and the piping structure section 7 may be integrally formed as an integrated body that does not have any joining portions provided by a method other than welding. The term "integrated" refers to a completely integrated structure that includes no connection using another jig, such as a bolt and a screw, and that does not have such connecting portions, or refers to a structure that have connecting portions which are provided by joining a plurality of parts (components) with use of welded portions only. By providing the integrated structure in this manner, it is possible to provide a reliable body 1 that does not cause liquid leakage. It is also feasible as a valve which treats cryogenic liquid hydrogen as a fluid. Further, as compared to the case in which the connection is provided with use of a jig, the foregoing case eliminates the need to arrange a jig on the outer surface of the body 1 and allows the outer surface to be a surface having small asperities. This is suitable for, for example, a case in which a vacuum jacket that completely covers a part other than the bonnet 2 is attached in a case of handling liquid hydrogen. The vacuum jacket contributes to maintaining liquid hydrogen flowing through the flow path P at an appropriate temperature due to the heat insulation effect. Further, if the body 1 is integrally structured only by welding, the body 1 has high structural strength. Thus, it is possible to form a large flow path to allow a large amount of a fluid (liquid hydrogen) to flow therethrough. The flow rate can be set as appropriate on the basis of the pipe diameter of the pipe structure section 7, the size of the ball 4, and the bore of the flow path 4a. For example, the valve 10 of Embodiment 1 can realize a configuration such that the pipe diameter of the piping structure section 7 and the bore of the flow path 4a are relatively larger diameters of not less than centimeters. For example, the valve 10 of the present embodiment can be configured such that the pipe diameter of the piping structure section 7 and the bore of the flow path 4a are approximately 10 inches to 24 inches (approximately 25 to 65 centimeters).

Note that, although the ball valve is employed in Embodiment 1, valves of other types (glove valve and butterfly valve) may be employed.

As described above, according to Embodiment 1, by bringing a part of the first tapered section 41 of the projection 4b and the tapered section 55 into contact with each other, the tapered section 55 guides the projection 4b so that the entire circumference of the tip end edge of the projection 4b is located on the bottom side with respect to the tapered section 55. This makes it possible to avoid a situation in which the tip end edge of the projection 4b comes into contact with the depression 51a or the bearing section 56 disposed in the depression 51a and applies an excessive load, and to axially support the projection 4b properly in the depression 51a.

Figure 16:
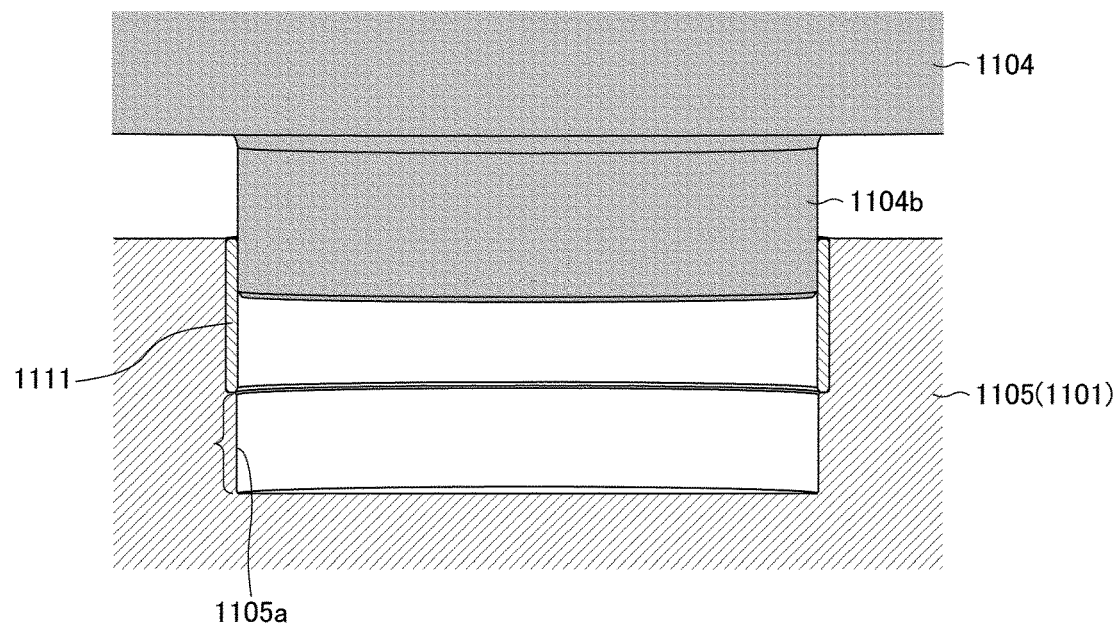
FIG. 16 is a diagram for explaining a comparative configuration.

Here, FIG. 16 illustrates, as a comparative configuration, a partial enlarged view of the ball 1104, which serves as the ball valve disc, and a valve disc housing section 1105 of a body 1101, which serves as the valve body. In the comparative configuration of FIG. 16, the tapered section 55 of the depression 51a of the valve disc housing section 5 in accordance with in Embodiment 1 is eliminated. Further, in the comparative configuration of FIG. 16, the first tapered section 41 and the second tapered section 42 of the projection 4b of the ball 4 in accordance with Embodiment 1 are also eliminated. FIG. 16 illustrates a state of fitting together a shaft section 1104b provided on the bottom surface of the ball 1104 and a shaft support hole 1105a provided in the valve disc housing section 1105. If the valve is a top entry valve, the ball 1104 produces a blind spot, so that it is difficult to observe how the fitting is progressing during the fitting, as described earlier. Thus, as illustrated in FIG. 16, an edge portion of the tip end of the shaft section 1104b comes into contact with a peripheral portion of the shaft support hole 1105a and excessively applies a load. For example, there may be a case in which an edge portion of the tip end of the shaft section 1104b is deformed, or a case in which the inner circumferential surface of the shaft support hole 1105a is damaged. Either case might become a factor that prevents proper axial support of the ball 1104. Further, in a case in which a bearing section 1111 is provided in the shaft support hole 1105a as illustrated in FIG. 16, there may be a case in which, for example, the edge portion of the shaft section 1104b causes damage to the bearing section 1111 if the shaft section 1104b is inserted into the shaft support hole 1105a in an inclined state. In contrast, the tapered section 55 may be provided in the depression 51a as in Embodiment 1, so that the tapered section 55 guides the projection 4b, to ensure good fitting. This makes it possible to axially support the ball properly, without causing the abovementioned problems.

[Variations]

As in Embodiment 1, the tapered section 55 is sufficient to prevent an excessive load on the depression 51a and the bearing section 56 provided in the depression 51a. In other words, it is preferable that the first tapered section 41 of the projection 4b be provided to prevent an excessive load on the depression 51a and the bearing section 56, but the first tapered section 41 is not essential. That is, in accordance with an aspect of the present invention, the ball 4 may be provided with a straight barrel-shaped projection instead of the projection 4b described in Embodiment 1, and the straight barrel-shaped projection may be brought into contact with the tapered section 55, and then be inserted into the depression 51a, to fit the projection in the depression 51a.

Embodiment 2

The following will describe another embodiment of the present invention in detail with reference to the drawings. Note that constituent elements having functions identical to those of Embodiment 1 are given respective identical reference numerals, and the description of those constituent elements is omitted.

In Embodiment 1, it is configured so that the projection 4b that projects downward is provided on the lower surface of the ball 4, the depression 51a is provided in the valve disc housing section 5, and the projection 4b and the depression 51a fit together. In contrast, this Embodiment 2 differs from Embodiment 1 in that a depression is provided in a lower surface of a ball 4 and is recessed upward, and a projection is provided in a valve disc housing section 5 and projects upward. The following will describe Embodiment 2 with reference to FIG. 15.

Figure 15:
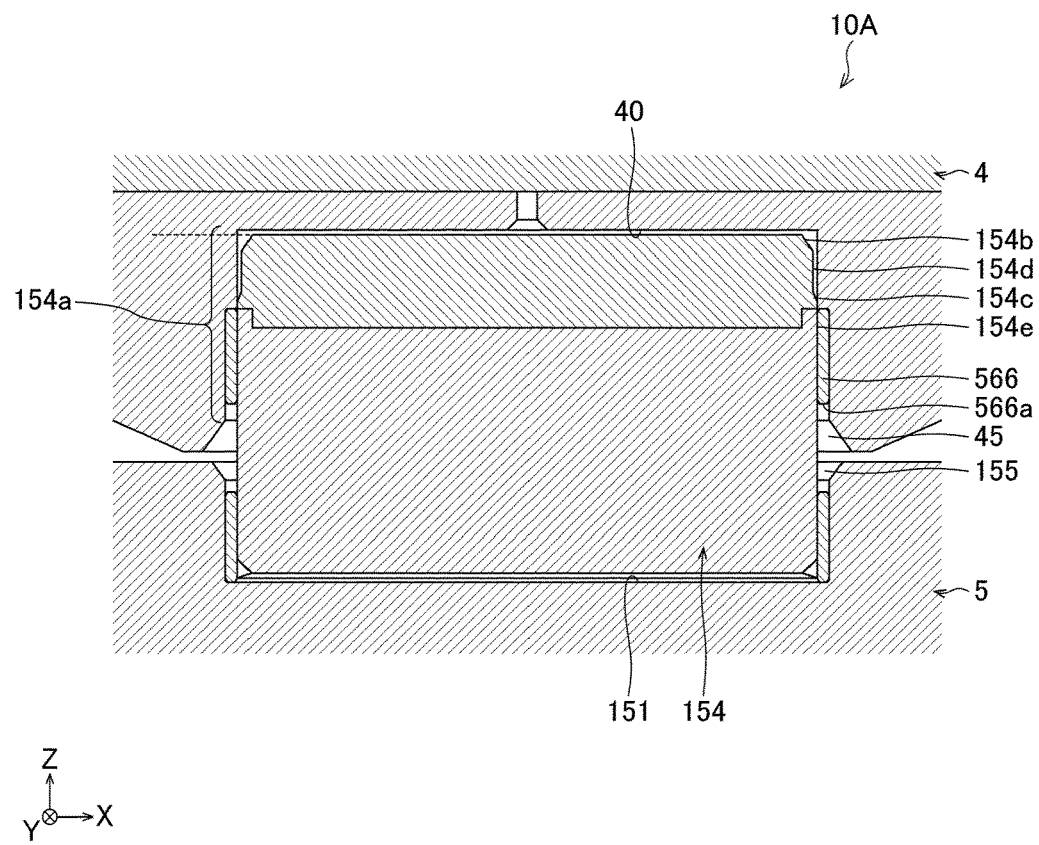
FIG. 15 is a cross-sectional view of a part of a ball valve in accordance with another embodiment of the valve in accordance with the present invention.

FIG. 15 is a cross-sectional view of a part of a valve 10A in accordance with Embodiment 2. FIG. 15 illustrates a fit portion in the valve 10A in which the lower surface of the ball 4 and the valve disc housing section 5 fit together. In FIG. 15, the valve disc housing section 5 is provided with a recess 151. The shape of the recess 151 is similar to that of the depression 51a of Embodiment 1. That is, the recess 151 opens upward and is provided with a bottom in the lower portion thereof. The recess 151 is provided, on an opening side, with a tapered section 155 that has an inner diameter gradually decreasing toward the bottom of the depression 151. In the recess 151, a rod-shaped lower stem 154 is fitted. A portion 154a of the lower stem 154 projects from the recess 151, and the projecting portion 154a serves as a projection to be fitted in the depression 40 of the ball 4.

Here, in a state in which the lower stem 154 is fitted in the recess 151, a bearing section 566 is disposed between the circumferential surface of the lower stem 154 and the inner circumferential surface of the recess 151. The bearing section 566 has a similar configuration and similar functions to those of the bearing section 56 of Embodiment 1.

The projecting portion 154a of the lower stem 154 projecting from the recess 151 has a similar configuration to that of the projection 4b of Embodiment 1. That is, provided at the tip end edge of the tip end portion of the projecting portion 154a projecting from the recess 151 (hereinafter, referred to as the tip end portion of the lower stem 154) is a lower stem tapered section 154b (first tapered section) that has a diameter gradually decreasing toward the tip end. The lower stem tapered section 154b has similar functions to those of the first tapered section 41 of the projection 4*b* of Embodiment 1 (e.g., FIGS. 3 and 4).

Further, the projecting portion 154*a* has, on a base portion side of the lower stem tapered section 154*b* (i.e., on a side opposite to the tip end portion of the lower stem 154), a second lower stem tapered section 154*c* (second tapered section) that has a diameter gradually decreasing toward the tip end portion of the lower stem 154. Between the lower stem tapered section 154*b* and the second lower stem tapered section 154*c*, a cylindrical intermediate section 154*d* is provided. The projecting portion 154*a* also has a straight barrel section 154*e* on a base portion side with respect to the second lower stem tapered section 154*c*. That is, the projecting portion 154*a* has, along the projecting direction, the straight barrel section 154*e*, the second lower stem tapered section 154*c*, the intermediate section 154*d*, and the lower stem tapered section 154*b* in this order.

Note that, like the projection 4*b* of Embodiment 1, the projecting portion 154*a* may be such that the straight barrel section 154*e*, the second lower stem tapered section 154*c*, the intermediate section 154*d*, and the lower stem tapered section 154*b* are integrally formed. Alternatively, the components of the projecting portion 154*a* except for the straight barrel section 154*e* may be constituted by a member separated from the straight barrel section 154*e*, and may be fixed to an end portion of the straight barrel section 154*e*. When the straight barrel section 154*e* and the other components are formed of separated members, a method of fixing the straight barrel section 154*e* and the other components may include, for example, screwing and fitting, and is not particularly limited thereto. In this case, the material of the straight barrel section 154*e* and that of the other components (the second lower stem tapered section 154*c*, the intermediate section 154*d*, and the lower stem tapered section 154*b*) may be the same or may be different.

The depression 40 of the ball 4 has, on an opening side, a tapered section 45 that has an inner diameter gradually decreasing toward the bottom of the depression 40. The tapered section 45 guides the tip end portion of the projecting portion 154*a* when the projecting portion 154*a* is inserted into the depression 40. Specifically, during the insertion, a part of the tip end edge of the projecting portion 154*a* is brought into contact with the tapered section 45. Specifically, when the ball 4 is introduced into the valve disc housing section 5 with the ball 4 inclined, the following will occur. That is, as the depression 40 advances toward the projecting portion 154*a*, the inclination of the ball 4 is corrected to be vertical by the guide provided by the tapered section 154*b*, and the central axis of the depression 40 moves (to be aligned) in a direction such that the central axis of the depression 40 approaches the central axis of the protruding portion 154*a*. This allows the projecting portion 154*a* to be guided so that the entire circumference of the tip end edge of the projecting portion 154*a* is located on the bottom side of the depression 40 with respect to the tapered section 45. That is, when a portion of the tip end portion of the projecting portion 154*a* in contact with the tapered section 45 moves past the tapered section 45, the entire circumference of the tip end edge of the tip end portion of the projecting portion 154*a* is guided to a side closer to the bottom of the depression 40 with respect to the tapered section 45. Thus, the projecting portion 154*a* is guided to the depression 40 so as not to come into contact with a wall surface of the depression 40.

Here, it is more preferable that an end edge 566*a* of the bearing section 566 on the opening side of the depression 40 be on an extension of the inclined surface of the tapered section 45 of the depression 40, or alternatively, it is more preferable that the end edge 566*a* be located on the bottom side of the depression 40 with respect to the extension and be located on the bottom side of the depression 40 with respect to the extension. This makes it possible to prevent the tip end edge of the projecting portion 154*a* (the lower stem tapered section 154*b*) from coming into contact with the end edge 566*a* of the bearing section 566. Thus, it is possible to prevent a crack or the like from occurring on the inner circumferential surface of the bearing section 566.

As described in the foregoing, according to Embodiment 2, similarly to Embodiment 1, since the depression 40 and the projection (projecting portion 154*a*) are guided by the contact of the tapered surfaces, it is possible to achieve smooth fitting.

The valve 10A in accordance with Embodiment 2 can be manufactured by steps similar to the manufacturing method (assembly procedure) described in Embodiment 1.

Note that the projection is realized by providing the depression 151 and inserting into the depression 151 the lower stem 154 so that the lower stem sticks out, instead of forming a projection in such a manner as to be integrated with the valve disc housing section 5. This makes the projection easy to manufacture and process, and is therefore preferable. However, the projection may be integrally formed in the valve disc housing section 5.

Aspects of the present invention can also be expressed as follows:

A valve 10, 10A in accordance with Aspect 1 of the present invention is a valve 10, 10A of a top entry type or a side entry type, including: a body 1 having one of a depression and a projection (depression 51*a* (FIG. 3), projection 154*a* (FIG. 15)); and a valve disc (ball 4) having the other of the depression and the projection (projection 4*b* (FIG. 3), depression 40 (FIG. 15)) on a tip end side in a direction in which the valve disc is inserted into the body 1, the valve disc being configured to be placed in the body 1 by fitting the projection 4*b* (FIG. 3), 154*a* (FIG. 15) in the depression 51*a* (FIG. 3), 40 (FIG. 15), the depression 51*a* (FIG. 3), (FIG. 15) having, on an opening side, a tapered section 55 (FIG. 3), 45 (FIG. 15) that has an inner diameter gradually decreasing toward a bottom of the depression 51*a* (FIG. 3), 40 (FIG. 15), a part of a tip end edge of the projection 4*b* (FIG. 3), 154*a* (FIG. 15) being configured to be brought into contact with the tapered section when the projection is inserted into the depression, the tapered section 55 (FIG. 3), 45 (FIG. 15) being configured to guide the projection 4*b* (FIG. 3), 154*a* (FIG. 15) so that an entire circumference of the tip end edge of the projection 4*b* (FIG. 3), 154*a* (FIG. 15) is located on a bottom side with respect to the tapered section 55 (FIG. 3), 45 (FIG. 15).

According to the configuration of Aspect 1, it is possible to provide the valve 10, 10A that is capable of axially supporting the valve disc properly in the body 1. Specifically, according to the configuration of Aspect 1, by bringing the part of the tip end edge (first tapered section 41, lower stem tapered section 154*b*) of the projection 4*b* (FIG. 3), 154*a* (FIG. 15) into contact with the tapered section 55 (FIG. 3), 45 (FIG. 15), the tapered section 55 (FIG. 3), (FIG. 15) guides the projection 4*b* (FIG. 3), 154*a* (FIG. 15) so that the entire circumference of the tip end edge of the projection 4*b* (FIG. 3), 154*a* (FIG. 15) is located on the bottom side with respect to the tapered section 55 (FIG. 3), 45 (FIG. 15). This makes it possible to avoid a situation in which the tip end edge of the projection 4*b* (FIG. 3), 154*a* (FIG. 15) comes into contact with the depression 51*a* (FIG. 3), 40 (FIG. 15) (including the bearing section 56 when the bearing section 56 (FIG. 3), 566 (FIG. 15) is disposed in the depression 51a, 40) and applies an excessive load thereon, and to properly fit the projection 4b (FIG. 3), 154a (FIG. 15) in the depression 51a (FIG. 3), 40 (FIG. 15). Thus, it is possible to provide the valve 10, 10A that is capable of axially supporting the valve disc properly in the body 1.

A valve 10 in accordance with Aspect 2 of the present invention may have, in addition to the configuration of Aspect 1, a configuration in which: the body 1 has a waistless shape and is long in a longitudinal direction, and the body 1 has, in an upper portion, an opening (upper end opening 6b) that allows the valve disc (ball 4) to pass therethrough, and has, in a lower portion, a valve disc housing section 5 that has the depression 51a; and the valve disc (ball 4) has the projection 4b, and is configured to be placed in the valve disc housing section 5 by being introduced, through the opening (upper end opening 6b), into the valve disc housing section 5 with the projection 4b facing downward.

A valve 10, 10A in accordance with Aspect 3 of the present invention may have, in addition to the configuration of Aspect 1 or 2, a configuration in which the valve disc is a ball valve disc (ball 4).

According to the configuration of Aspect 3, when the ball 4 is inserted by top or side entry, the projection (4b) provided forward in the insertion direction cannot be observed because of a blind spot produced by the ball 4. Even is such a situation, since the tapered section 55 guides the projection 4b, the projection 4b can be fitted in the depression 51a properly.

A valve 10, 10A in accordance with Aspect 4 of the present invention may have, in addition to the configuration of any one of Aspects 1 to 3, a configuration in which the projection 4b has, at the tip end edge, a first tapered section 41 that has a diameter gradually decreasing toward a tip end.

According to Aspect 4, in the valve 10, as illustrated in FIG. 3, by bringing the part of the first tapered section 41 of the projection 4b into contact with the tapered section 55, the tapered section 55 guides the projection 4b so that the entire circumference of the first tapered section 41 of the projection 4b is located on the bottom side with respect to the tapered section 55. Further, in the valve 10A, as illustrated in FIG. 15, by bringing the part of the lower stem tapered section 154b of the projection 154a into contact with the tapered section 45, the tapered section 45 guides the projection 154a so that the entire circumference of the lower stem tapered section 154b of the projection 154a is located on the bottom side with respect to the tapered section 45.

With this configuration, it is possible to properly fit the projection 4b (FIG. 3) and the projection 154a (FIG. 15) in the depression 51a (FIG. 3) and the depression 40 (FIG. 15), respectively. Thus, it is possible to provide the valve 10, 10A that is capable of axially supporting the valve disc properly in the body 1.

A valve 10, 10A in accordance with Aspect 5 of the present invention may have, in addition to the configuration of Aspect 4, a configuration in which the projection 4b (FIG. 3), 154a (FIG. 15) has, on a base end side with respect to the first tapered section 41 (FIG. 3), 154b (FIG. 15), a second tapered section 42 (FIG. 3), 154c (FIG. 15) that has a diameter gradually decreasing toward a tip end.

According to the configuration of Aspect 5, besides the first tapered section 41 (FIG. 3), 154b (FIG. 15), the second tapered section 42, 154c can align the projection 4b (FIG. 3) and the projection 154a (FIG. 15), so that it is possible to insert the projection 4b (FIG. 3) and the projection 154a (FIG. 15) into the depression 51a (FIG. 3) and the depression 40 (FIG. 15), respectively, more smoothly.

A valve 10, 10A in accordance with Aspect 6 of the present invention may have, in addition to the configuration of Aspect 5, a configuration in which the following relational expression is satisfied:

$$D1<D2<D3,$$

wherein D1 is a diameter of the tip end of the second tapered section (FIG. 3), 154c (FIG. 15), D2 is a diameter of a base end of the second tapered section, and D3 is a diameter of a straight barrel section provided on a valve disc side with respect to the second tapered section.

According to the configuration of Aspect 6, since the projection 4b (FIG. 3) and the projection 154a (FIG. 15) have tapered shapes, it is easy to fit the projection 4b (FIG. 3) and the projection 154a (FIG. 15) in the depression 51a (FIG. 3) and the depression 40 (FIG. 15), respectively, during insertion.

A valve 10, 10A in accordance with Aspect 7 of the present invention, in addition to the configuration of any one of Aspects 1 to 6, further includes a bearing section 56, 566 disposed on an inner circumferential wall of the depression 51a (FIG. 3) and the depression 40 (FIG. 15), and configured to be exposed to the depression 51a (FIG. 3) and the depression 40 (FIG. 15).

According to the configuration of Aspect 7, since the tapered section 55 (FIG. 3), 45 (FIG. 15) of the depression 51a (FIG. 3) and the depression 40 (FIG. 15) guides the projection 4b (FIG. 3) and the projection 154a (FIG. 15), respectively, so that the entire circumference of the tip end edge (first tapered section 41 (FIG. 3), lower stem tapered section 154b (FIG. 15)) of the projection 4b (FIG. 3) and the projection 154a (FIG. 15) is located on the bottom side with respect to the tapered section 55, 45 (FIG. 15), it is possible to prevent the projection 4b (FIG. 3) and the projection 154a (FIG. 15) from applying an excessive load on the bearing section 56, 566.

A valve 10, 10A in accordance with Aspect 8 of the present invention may have, in addition to the configuration of Aspect 7, a configuration in which an end edge of the bearing section on the opening side of the depression is located on a bottom side of the depression with respect to an extension of an inclined surface of the tapered section of the depression.

By defining the position of the end edge 56a, 566a of the bearing section 56, 566 as in the configuration of Aspect 8, it is possible to prevent the tip end edge (first tapered section 41 (FIG. 3), lower stem tapered section 154b (FIG. 15)) of the projection 4b (FIG. 3) and the projection 154a (FIG. 15) from coming into contact with the end edge 56a, 566a of the bearing section 56, 566, or even in a case in which they come into contact, it is possible to prevent an excessive load on the end edge 56a, 566a of the bearing section 56, 566.

A method for manufacturing a valve 10, 10A in accordance with Aspect 9 of the present invention is a method for manufacturing the valve in accordance with any one of Aspects 1 to 8, the method including: a first step of inserting the valve disc (ball 4) into the body 1 through an upper end opening of the body 1, and allowing the valve disc to move downward to a lower portion of the body 1; and a second step of, following the first step S101, fitting the projection in the depression in the lower portion of the body, to place the valve disc at a predetermined position in the body, wherein, in the second step S102, a part of a tip end edge of the projection is brought into contact with the tapered section when the projection is inserted into the depression, and the tapered section guides the projection so that an entire circumference of the tip end edge of the projection is located on the bottom side with respect to the tapered section.

According to the manufacturing method of Aspect 9, it is possible to provide the valve 10, 10A that is capable of axially supporting the valve disc properly in the body 1. Specifically, according to the configuration of Aspect 10, by bringing the part of the tip end edge (first tapered section 41, lower stem tapered section 154b) of the projection 4b (FIG. 3), 154a (FIG. 15) into contact with the tapered section 55 (FIG. 3), 45 (FIG. 15), the tapered section 55 (FIG. 3), 45 (FIG. 15) guides the projection 4b (FIG. 3), 154a (FIG. 15) so that the entire circumference of the tip end edge of the projection 4b (FIG. 3), 154a (FIG. 15) is located on the bottom side with respect to the tapered section 55 (FIG. 3), 45 (FIG. 15). This makes it possible to avoid a situation in which the tip end edge of the projection 4b (FIG. 3), 154a (FIG. 15) comes into contact with the depression 51a (FIG. 3), 40 (FIG. 15) (including the bearing section 56 when the bearing section 56 (FIG. 3), 566 (FIG. 15) is disposed in the depression 51a, 40) and applies an excessive load thereon, and to properly fit the projection 4b (FIG. 3), 154a (FIG. 15) in the depression 51a (FIG. 3), 40 (FIG. 15). Thus, it is possible to provide the valve 10, 10A that is capable of axially supporting the valve disc properly in the body 1.

Further, a method for manufacturing a valve 10, 10A in accordance with Aspect 10 of the present invention may be configured, in addition to the configuration of Aspect 9, such that, in the first step, the valve disc moves downward to the lower portion of the body in a state in which a jig for inserting the valve disc into the body is connected to an upper surface of the valve disc or in a state in which a valve shaft is connected to the upper face of the valve disc; and in the second step, an axis of the jig or an axis of the valve shaft is inclined within a range of more than 0° and not more than 3°, with respect to a central axis of the body extending from the upper end opening to the lower portion, in a phase just before the part of the tip end edge of the projection is brought into contact with the tapered section, that is, at the time when the part of the tip end edge of the projection moving downward arrives in the vicinity of the tapered section.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Body
3 Stem
4 Ball (valve disc, ball valve disc)
4a Flow path
4b Projection
5 Valve disc housing section
6 Stem housing section
6a Communication port
6b Upper end opening (opening)
6c Intermediate portion
10 Valve
40 Depression
41 First tapered section
42 Second tapered section
43, 154d Intermediate section
44, 154e Straight barrel section
45 Tapered section
51 Central region
51a Depression
52 End region
55 Tapered section
56 Bearing section
56a End edge
57 First region
58 Second region
60 Inner lid body
154 Lower stem
154a Projecting portion (projection)
154b Lower stem tapered section (first tapered section)
154c Second lower stem tapered section (second tapered section)

The invention claimed is:

1. A valve of a top entry type, comprising: a body having one of a depression and a projection; and a valve disc having the other of the depression and the projection on a tip end side in a direction in which the valve disc is inserted into the body, the valve disc being configured to be placed in the body by fitting the projection in the depression,
the depression having, on an opening side, a tapered section that has an inner diameter gradually decreasing toward a bottom of the depression,
a part of a tip end edge of the projection being configured to be brought into contact with the tapered section when the projection is inserted into the depression,
the tapered section being configured to guide the projection so that an entire circumference of the tip end edge of the projection is located on a bottom side with respect to the tapered section,
wherein the projection has, at the tip end edge, a first tapered section that has a diameter gradually decreasing toward a tip end,
wherein the projection has, on a base end side with respect to the first tapered section, a second tapered section that has a diameter gradually decreasing toward a tip end,
wherein a cylindrical intermediate section is provided between the first tapered section and the second tapered section.

2. The valve according to claim 1, wherein:
the body has a waistless shape and is long in a longitudinal direction, and the body has, in an upper portion, an opening that allows the valve disc to pass therethrough, and has, in a lower portion, a valve disc housing section that has the depression; and
the valve disc has the projection, and is configured to be placed in the valve disc housing section by being introduced, through the opening, into the valve disc housing section with the projection facing downward.

3. The valve according to claim 1, wherein the valve disc is a ball valve disc.

4. The valve according to claim 1, wherein the projection has, at the tip end edge, a first tapered section that has a diameter gradually decreasing toward a tip end.

5. The valve according to claim 1, wherein the following relational expression is satisfied:

$$D1 < D2 < D3,$$

wherein D1 is a diameter of the tip end of the second tapered section, D2 is a diameter of a base end of the second tapered section, and D3 is a diameter of a straight barrel section provided on a valve disc side with respect to the second tapered section.

6. The valve according to claim 1, further comprising a bearing section disposed on an inner circumferential wall of the depression, and configured to be exposed to the depression.

7. The valve according to claim 6, wherein an end edge of the bearing section on the opening side of the depression is located on a bottom side of the depression with respect to an extension of an inclined surface of the tapered section of the depression.

8. A method for manufacturing a valve, wherein the valve is a valve of top entry type, comprising: a body having one of a depression and a projection; and a valve disc having the other of the depression and the projection on a tip end side in a direction in which the valve disc is inserted into the body, the valve disc being configured to be placed in the body by fitting the projection in the depression, the depression having, on an opening side, a tapered section that has an inner diameter gradually decreasing toward a bottom of the depression, a part of a tip end edge of the projection being configured to be brought into contact with the tapered section when the projection is inserted into the depression, the tapered section being configured to guide the projection so that an entire circumference of the tip end edge of the projection is located on a bottom side with respect to the tapered section;

said method for manufacturing a valve comprising:

a first step of inserting the valve disc into the body through an upper end opening of the body, and allowing the valve disc to move downward to a lower portion of the body; and a second step of, following the first step, fitting the projection in the depression in the lower portion of the body, to place the valve disc at a predetermined position in the body, wherein, in the second step, a part of a tip end edge of the projection is brought into contact with the tapered section when the projection is inserted into the depression, and the tapered section guides the projection so that an entire circumference of the tip end edge of the projection is located on the bottom side with respect to the tapered section.

9. The method according to claim 8, wherein:

in the first step, the valve disc moves downward to the lower portion of the body in a state in which a jig for inserting the valve disc into the body is connected to an upper surface of the valve disc or in a state in which a valve shaft is connected to the upper face of the valve disc; and in the second step, an axis of the jig or an axis of the valve shaft is inclined within a range of more than 0° and not more than 3°, with respect to a central axis of the body extending from the upper end opening to the lower portion, in a phase just before the part of the tip end edge of the projection is brought into contact with the tapered section.

10. The valve according to claim 1, wherein the projection has, at the tip end edge, a first tapered section that has a diameter gradually decreasing toward a tip end.

11. The valve according to claim 10, wherein the projection has, on a base end side with respect to the first tapered section, a second tapered section that has a diameter gradually decreasing toward a tip end.

12. The valve according to claim 11, wherein the following relational expression is satisfied:

$D1<D2<D3$, wherein D1 is a diameter of the tip end of the second tapered section, D2 is a diameter of a base end of the second tapered section, and D3 is a diameter of a straight barrel section provided on a valve disc side with respect to the second tapered section.

13. A valve of a top entry type, comprising:

a body having one of a depression and a projection;

a valve disc having the other of the depression and the projection on a tip end side in a direction in which the valve disc is inserted into the body, the valve disc being configured to be placed in the body by fitting the projection in the depression; and a bearing section disposed on an inner circumferential wall of the depression, and configured to be exposed to the depression;

the depression having, on an opening side, a tapered section that has an inner diameter gradually decreasing toward a bottom of the depression, a part of a tip end edge of the projection being configured to be brought into contact with the tapered section when the projection is inserted into the depression, the tapered section being configured to guide the projection so that an entire circumference of the tip end edge of the projection is located on a bottom side with respect to the tapered section, wherein an end edge of the bearing section on the opening side of the depression is located on a bottom side of the depression with respect to an extension of an inclined surface of the tapered section of the depression.

14. The valve according to claim 13, wherein:

the body has a waistless shape and is long in a longitudinal direction, and the body has, in an upper portion, an opening that allows the valve disc to pass therethrough, and has, in a lower portion, a valve disc housing section that has the depression; and the valve disc has the projection, and is configured to be placed in the valve disc housing section by being introduced, through the opening, into the valve disc housing section with the projection facing downward.

15. The valve according to claim 13, wherein the valve disc is a ball valve disc.

16. The valve according to claim 13, further comprising a bearing section disposed on an inner circumferential wall of the depression, and configured to be exposed to the depression.

* * * * *